United States Patent
Fukatsu et al.

(10) Patent No.: US 11,124,115 B2
(45) Date of Patent: Sep. 21, 2021

(54) VEHICLE FRONT LIGHTING APPARATUS AND DISCONNECTION DETECTION METHOD

(71) Applicant: DENSO CORPORATION, Kariya (JP)

(72) Inventors: Yoichi Fukatsu, Kariya (JP); Toshiya Tanaka, Kariya (JP); Yosuke Ishiguro, Kariya (JP); Hisanori Takenaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/902,614

(22) Filed: Jun. 16, 2020

(65) Prior Publication Data

US 2020/0307442 A1 Oct. 1, 2020

Related U.S. Application Data

(63) Continuation of application No. PCT/JP2018/040931, filed on Nov. 5, 2018.

(30) Foreign Application Priority Data

Dec. 22, 2017 (JP) .............................. JP2017-247085

(51) Int. Cl.
*B60Q 11/00* (2006.01)
*B60Q 1/00* (2006.01)
*B60Q 1/076* (2006.01)
*H05B 45/54* (2020.01)
*H05B 47/165* (2020.01)

(52) U.S. Cl.
CPC .......... *B60Q 11/005* (2013.01); *B60Q 1/0076* (2013.01); *B60Q 1/0094* (2013.01); *B60Q 1/076* (2013.01); *H05B 45/54* (2020.01); *H05B 47/165* (2020.01); *B60Q 2400/20* (2013.01)

(58) Field of Classification Search
CPC .... B60Q 1/076; B60Q 1/0076; B60Q 1/0094; B60Q 2400/20; B60Q 11/005; H05B 45/48; H05B 45/54; H05B 47/165
See application file for complete search history.

(56) References Cited

U.S. PATENT DOCUMENTS

| 2018/0063918 A1* | 3/2018 | Nakamura | B60Q 1/0094 |
| 2019/0098710 A1* | 3/2019 | Murakami | H05B 45/10 |
| 2020/0187327 A1* | 6/2020 | Ichikawa | H05B 45/48 |

FOREIGN PATENT DOCUMENTS

| JP | 2008037240 A | 2/2008 |
| JP | 2016088223 A | 5/2016 |
| JP | 2017152169 A | 8/2017 |

OTHER PUBLICATIONS

U.S. Appl. No. 16/902,596, filed Jun. 16, 2020, Fukatsu et al.
U.S. Appl. No. 16/902,634, filed Jun. 16, 2020, Fukatsu et al.

* cited by examiner

*Primary Examiner* — Borna Alaeddini
(74) *Attorney, Agent, or Firm* — Harness, Dickey & Pierce, P.L.C.

(57) ABSTRACT

In a vehicle front lighting apparatus, the number of switch elements brought into an opened state and an applied voltage value is detected every time a predetermined detection condition is satisfied, the amount of change from the number of switch elements detected last time and the amount of change from the voltage value detected last time are acquired, and it is determined that a disconnection has occurred if the amount of change in the number of switch elements does not match the amount of change in the voltage value.

6 Claims, 20 Drawing Sheets

FIG. 10B

| DETECTION TIMING | DT12 | DT1 | DT2 | DT3 | DT4 | DT5 | DT6 | DT7 | DT8 | DT9 | DT10 | DT11 | DT12 | DT1 |
|---|---|---|---|---|---|---|---|---|---|---|---|---|---|---|
| THE NUMBER OF LIGHTING LEDS | 8 | 9 | 10 | 10 | 10 | 7 | 4 | 5 | 6 | 6 | 7 | 8 | 8 | 9 |
| THE NUMBER OF ACTUAL LIGHTING LEDS | 8 | 9 | 10 | 11 | 10 | 7 | 4 | 5 | 6 | 7 | 8 | 9 | 8 | 9 |

FIG. 10C

| DETECTION TIMING | DT12 | DT1 | DT2 | DT3 | DT4 | DT5 | DT6 | DT7 | DT8 | DT9 | DT10 | DT11 | DT12 | DT1 |
|---|---|---|---|---|---|---|---|---|---|---|---|---|---|---|
| THE AMOUNT OF CHANGE IN THE NUMBER OF LIGHTING LEDS | +1 | +1 | 0 | 0 | −3 | −3 | +1 | +1 | 0 | +1 | +1 | 0 | +1 | +1 |
| THE AMOUNT OF CHANGE IN THE NUMBER OF ACTUAL LIGHTING LEDS | +1 | +1 | +1 | −1 | −3 | −3 | +1 | +1 | +1 | +1 | +1 | −1 | +1 | +1 | ated by the vehicle front lighting apparatus;

VEHICLE FRONT LIGHTING APPARATUS AND DISCONNECTION DETECTION METHOD

CROSS REFERENCE TO RELATED APPLICATIONS

The present application is a continuation application of International Patent Application No. PCT/JP2018/040931 filed on Nov. 5, 2018, which designated the U.S. and claims the benefit of priority from Japanese Patent Application No. 2017-247085 filed on Dec. 22, 2017. The entire disclosures of all of the above applications are incorporated herein by reference.

TECHNICAL FIELD

The present disclosure relates to a vehicle front lighting apparatus and a disconnection detection method.

BACKGROUND

Conventionally, there has been known a vehicle front lighting apparatus that uses multiple lighting devices to illuminate a region in front of a vehicle in a shared manner.

SUMMARY

The present disclosure provides a vehicle front lighting apparatus and a disconnection detection method in which it is determined whether a disconnection has occurred according to whether the amount of change in the number of lighting devices to be turned on matches the amount of change in an applied voltage value.

BRIEF DESCRIPTION OF DRAWINGS

Objects, features and advantages of the present disclosure will become apparent from the following detailed description made with reference to the accompanying drawings. In the drawings:

FIG. 10B is an illustrative view of a principle of detecting whether there is a disconnection in the bypass wiring by the vehicle front lighting apparatus;

FIG. 10C is an illustrative diagram of a principle of detecting whether there is a disconnection in the bypass wiring by the vehicle front lighting apparatus;

DETAILED DESCRIPTION

Figure 1A:
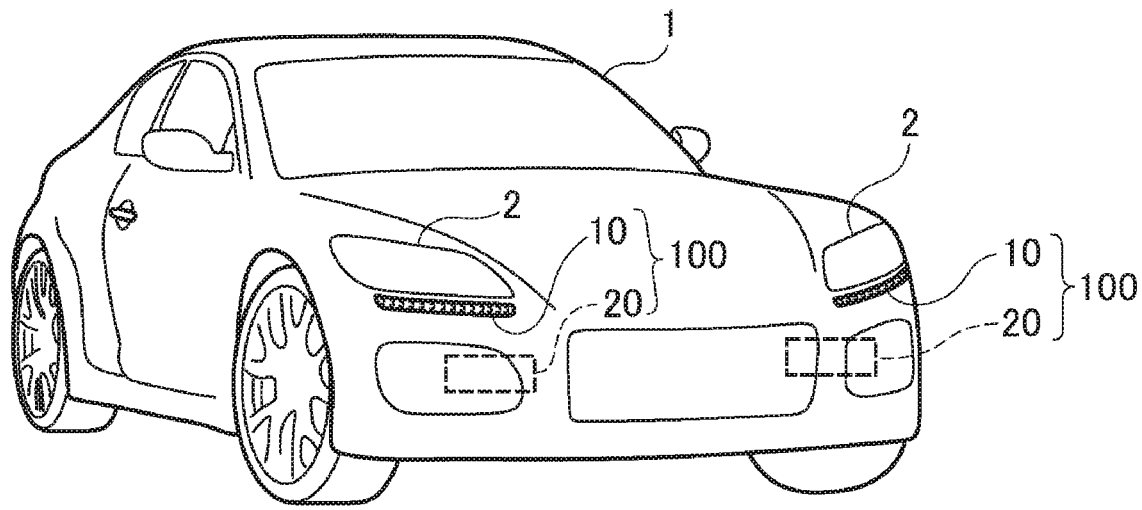
FIG. 1A is a diagram showing a vehicle on which a vehicle front lighting apparatus according to an embodiment of the present disclosure is mounted.

In a front lighting apparatus mounted on a subject vehicle, it is desired to be able to illuminate a light of high luminance to a long distance and in a wide range in order to enable a driver of the subject vehicle to grasp a situation at the long distance. On the other hand, in order to avoid illuminating a driver of an oncoming vehicle with high luminance to give a dazzle feeling (so-called glare), it is desired to be able to suppress the luminance of the light illuminating the region where the oncoming vehicle is present.

In a certain technique, a vehicle front lighting apparatus includes multiple lighting devices, and each lighting device is used to illuminate a region in front of a vehicle in a shared manner.

In the above technique, when an oncoming vehicle, a pedestrian, or the like are not present, a driver of a subject vehicle can easily grasp a distant situation by irradiating a light of high luminance to a distance and in a wide range. On the other hand, when the oncoming vehicle, the pedestrian, or the like is detected, a situation in which a driver of the oncoming vehicle, the pedestrian, or the like is given the dazzle feeling can be avoided by lowering the luminance of the lighting device in charge of the region where the oncoming vehicle, the pedestrian, or the like is present or turning off the lighting device.

Further, in the technique described above, the number of lighting devices mounted on the vehicle tends to gradually increase. The reason is that, as the number of mounted lighting devices increases, the region in which the lighting is shared by the individual lighting devices becomes smaller, and therefore, a situation can be prevented in which the lighting is darkened to a range in which the oncoming vehicle is not present when, for example, the oncoming vehicle is detected and the luminance of the lighting device is lowered or turned off. Alternatively, as the number of lighting devices increases, the region in front of the vehicle is subdivided into smaller regions, so that the distribution of the brightness illuminating the front can be brought closer to a more appropriate distribution.

However, as the number of lighting devices mounted on the vehicle increases, the number of wirings for driving the lighting devices also increases, thereby making it difficult to detect whether there is a disconnection in a wiring.

A vehicle front lighting apparatus according to an aspect of the present disclosure is for illuminating a region in front of a vehicle by use of a plurality of lighting devices in a shared manner, and includes: a lighting device array in which the lighting devices are connected in series; a plurality of bypass circuits respectively provided for the lighting devices and allowing a current flowing through the lighting devices to bypass the lighting devices; a plurality of switch elements respectively provided for the bypass circuits for opening and closing the bypass circuit; a lighting controller; a current value detector; a voltage value controller; a change amount detector; and a disconnection determiner. The lighting controller is configured to control a lighting mode of the lighting device array by bringing the switch elements corresponding to the lighting devices to be turned on into an opened state and bringing the switch elements corresponding to the lighting devices to be turned off into a closed state. The current value detector is configured to detect a value of current flowing through the lighting device array. The voltage value controller is configured to apply a voltage to the lighting device array, and to control a voltage value to be applied to cause a value of current flowing through the lighting device array to reach a predetermined target current value. The change amount detector is configured to detect the number of switch elements brought into the opened state and the voltage value that is controlled every time a predetermined detection condition is satisfied, and to acquire the amount of change from the number of switch elements detected last time and the amount of change from the voltage value detected last time. The disconnection determination unit determines whether the amount of change in the number of switch elements matches the amount of change in the voltage value, and determines that a disconnection has occurred in any of the bypass circuits if not match.

A disconnection detection method according to another aspect of the present disclosure is adopted in a vehicle front lighting apparatus that illuminates a region in front of a vehicle by use of a lighting device array in which a plurality of lighting devices are connected in series, for detecting whether a disconnection has occurred in a wiring for driving the lighting devices. The vehicle front lighting apparatus includes: a plurality of bypass circuits respectively provided for the lighting devices and allowing a current flowing through the lighting devices to bypass the lighting devices; a plurality of switch elements respectively provided for the bypass circuits for opening and closing the bypass circuits; and a lighting controller configured to control a lighting mode of the lighting device array by bringing the switch elements corresponding to the lighting devices to be turned on into an opened state and bringing the switch elements corresponding to the lighting devices to be turned off into a closed state. The disconnection detection method includes: applying a voltage to the lighting device array, detecting a value of current flowing through the lighting device array, and controlling a voltage value applied to the lighting device array to cause the value of current flowing through the lighting device array to reach a predetermined target current value; detecting the number of switch elements brought into the opened state every time a predetermined detection condition is satisfied, and acquiring the amount of change from the number of switch elements detected last time; detecting a voltage value applied to the lighting device array every time the detection condition is satisfied, and acquiring the amount of change from the voltage value detected last time; and determining whether the amount of change in the number of switch elements matches the amount of change in the voltage value, and determining that the disconnection has occurred in any of the bypass circuits if not match.

According to the vehicle front lighting apparatus and the disconnection detection method, it can be determined whether there is a disconnection according to whether the amount of change in the number of lighting devices to be turned on matches the amount of change in the applied voltage value, and therefore, it can be easily detected whether there is a disconnection in the wiring for driving the lighting devices even when the region in front of the vehicle is illuminated by use of the multiple lighting devices.

EMBODIMENT

A vehicle front lighting apparatus 100 according to an embodiment of the present disclosure will be described with reference to the drawings. FIG. 1A shows a vehicle 1 on which a front lighting apparatus (FL) 100 of the present embodiment is mounted. As shown in FIG. 1A, one front lighting apparatus 100 is mounted on each of the left and right sides of the vehicle 1, and each vehicle front lighting apparatus 100 includes an LED array 10 in which multiple light emitting diodes (hereinafter, referred to as LEDs) are disposed in a row, and a control module (CM) 20 for controlling lighting operation of individual LEDs forming the LED array 10. The LED arrays 10 are mounted one by one under headlights 2 mounted on the front left and right of the vehicle 1, and the control modules 20 are mounted inside the vehicle 1 inside the LED arrays 10.

Figure 1B:
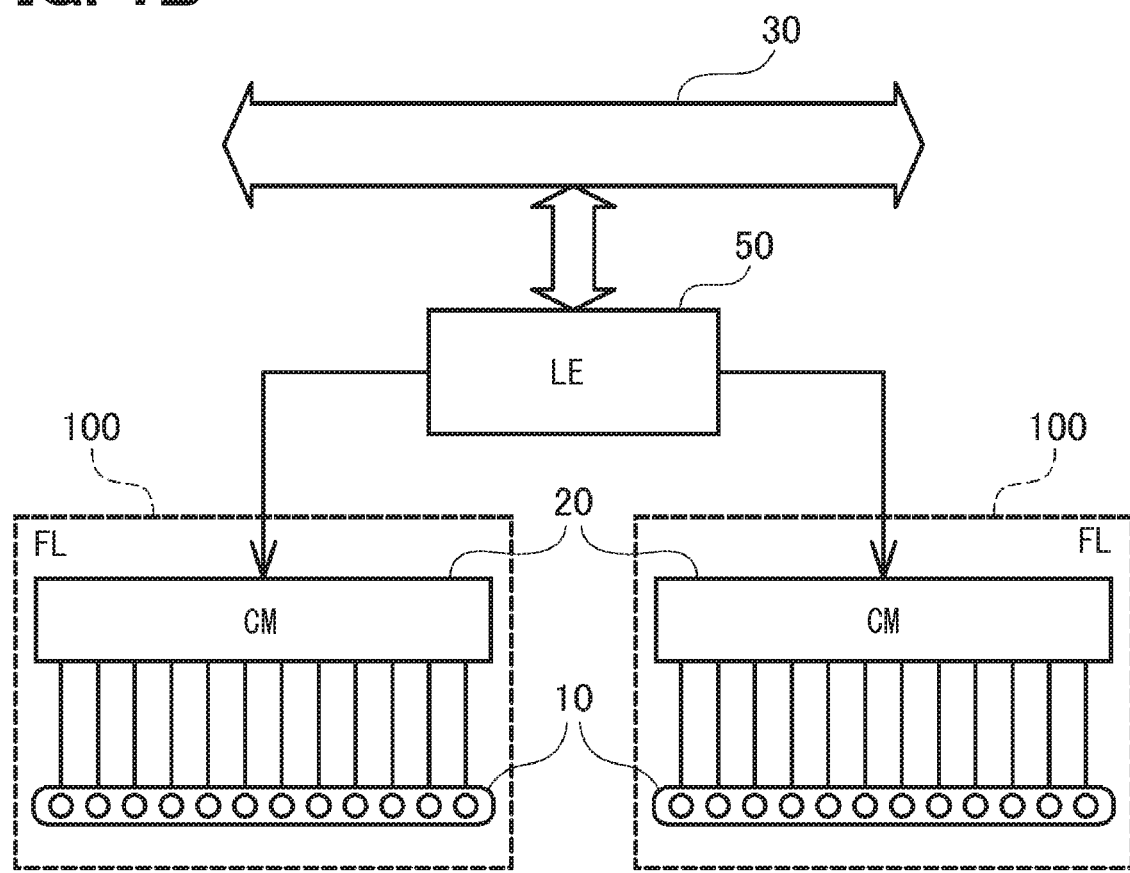
FIG. 1B is an illustrative diagram showing the vehicle front lighting apparatus mounted on the vehicle.

Further, as shown in FIG. 1B, the control modules 20 are each connected to a lamp ECU (LE) 50 mounted on the vehicle 1, and controls the operation of lighting the individual LEDs forming each LED array 10 in accordance with an instruction from the lamp ECU 50. The lamp ECU 50 is connected to an in-vehicle LAN 30 that connects multiple control ECUs (not shown) mounted on the vehicle 1, and determines an instruction content to be output to the lamp ECU 50 based on information received from other control ECUs through the in-vehicle LAN 30.

Figure 2:
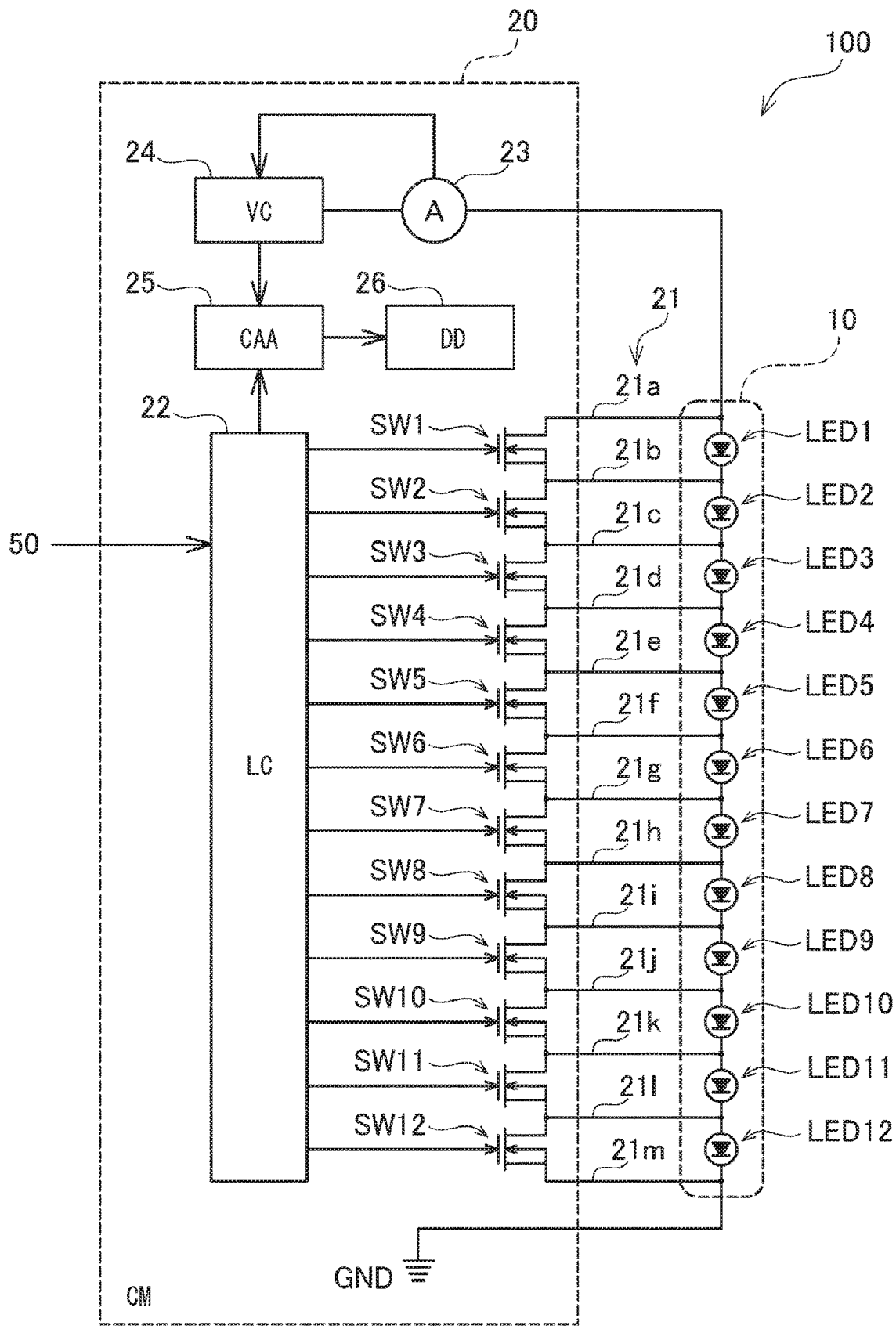
FIG. 2 is a block diagram showing an internal structure of the vehicle front lighting apparatus.

FIG. 2 shows a rough internal structure of the vehicle front lighting apparatus 100 according to the present embodiment. As shown in FIG. 1, the vehicle front lighting apparatus 100 according to the present embodiment includes an LED array 10 and a control module 20. The LED arrays 10 are each structured such that LED 1 to LED 12 is connected in series to each other, and a cathode side of the LED 12 is grounded to a ground GND. In the present embodiment, the LED 1 to the LED 12 correspond to "lighting devices" in the present disclosure, and the LED array 10 corresponds to an "lighting device array" in the present disclosure.

The control modules 20 each include the same number of switch elements SW1 to SW12 as that of the LED 1 to the LED 12 in the LED arrays 10, and the switch elements SW1 to SW12 are connected in series with each other. A bypass wiring 21a drawn from an anode side (that is, a side not connected to the LED 2) of the LED 1 is connected to an upstream side (that is, a side not connected to the switch element SW2) of the switch element SW1. A bypass wiring 21b drawn from between the LED 1 and the LED 2 is connected between the switch element SW1 and the switch element SW2. Further, a bypass wiring 21c drawn from between the LED 2 and the LED 3 is connected between the switch element SW2 and the switch element SW3. Hereinafter, in the same manner, bypass wirings 21d to 21l led out from between the LED 3 to the LED 12 are connected between the switch element SW3 and the switch element SW12. A bypass wiring 21m drawn from a cathode side (that is, a side grounded to the ground GND) of the LED 12 is connected to a downstream side (that is, a side not connected to the switch element SW11) of the switch element SW12.

For that reason, when the switch element SW1 is rendered conductive, the bypass wiring 21a and the bypass wiring 21b are rendered conductive through the switch element SW1, as a result of which a bypass circuit 21 that bypasses the LED 1 is formed. In addition, when the switch element SW2 is rendered conductive, the bypass wiring 21b and the bypass wiring 21c are rendered conductive through the switch element SW2, as a result of which the bypass circuit 21 that bypasses the LED 2 is formed. Similarly, the switch elements SW3 to SW12 are rendered conductive to form the bypass circuits 21 for bypassing the LED 3 to the LED 12, respectively.

A switch element called a power transistor is used as each of the switch elements SW1 to SW12. The power transistor has three terminals, and when a control terminal among those terminals is set to a high state, the other two terminals are rendered conductive, and when the control terminal is set to a low state, the other two terminals are rendered non-conductive.

In addition to the switch elements SW1 to SW12, the control module 20 also includes a lighting control unit (LC) 22, a current value detection unit 23, a voltage value control unit (VC) 24, a change amount acquisition unit (CAA) 25, and a disconnection determination unit (DD) 26. The lighting control unit 22 corresponds to a "lighting controller" in the present disclosure, the current value detection unit 23 corresponds to a "current value detector" in the present disclosure, a voltage value control unit 24 correspond to a "voltage value controller" in the present disclosure, the change amount acquisition unit 25 corresponds to a "change amount detector" in the present disclosure, and the disconnection determination unit 25 corresponds to a "disconnection determiner" in the present disclosure.

Note that those "units" are abstract concepts in which the inside of the control module 20 is classified for convenience, focusing on the functions of the control module 20 of the vehicle front lighting apparatus 100 in order for the control module 20 to light the LED 1 to the LED 12 and detect the presence or absence of disconnection in the bypass wirings 21a to 21m. Therefore, it is not meant that the control module 20 of the vehicle front lighting apparatus 100 is physically divided into those "units". Those "units" can be realized as a computer program executed by a CPU, can be realized as an electronic circuit including an LSI and a memory, or can be realized by combining the computer program with the electronic circuit.

The lighting control unit 22 is connected to control terminals of the switch elements SW1 to SW12, and the control terminals of the respective switch elements SW1 to SW12 can be individually set to a high state or a low state.

The current value detection unit 23 is connected in series with the LED array 10, and can detect a value of current flowing through the LED array 10. Since the LED 1 to the LED 12 are connected in series with each other inside the LED array 10, the current value detected by the current value detection unit 23 is a value of current flowing through each of the LED 1 to the LED 12.

The voltage value control unit 24 applies a voltage to the LED array 10, receives a value of current flowing through the LED array 10 from the current value detection unit 23, and controls a voltage value to be applied to the LED array 10 so that the current value becomes a predetermined target current value.

Every time a predetermined detection condition is satisfied, the change amount acquisition unit 25 receives the number of switch elements SW1 to SW12 whose control terminals are in a low state from the lighting control unit 22, and acquires the amount of change from the number received last time. Further, the change amount acquisition unit 25 receives a voltage value applied to the LED array 10 from the voltage value control unit 24, and acquires the amount of change from the previous voltage value. The detection condition may be various conditions such as each time a predetermined time elapses. Then, the change amount acquisition unit 25 outputs the amount of change in the number of switch elements SW1 to SW12 and the amount of change in the voltage value to the disconnection determination unit 26.

Upon receiving the amount of change in the number of switch elements SW1 to SW12 and the amount of change in the voltage value, the disconnection determination unit 26 determines whether both the amounts of change match each other. If those amounts of change do not match each other, it is determined that a disconnection has occurred in at least one of the bypass wirings 21a to 21m.

Hereinafter, a method for detecting the presence or absence of disconnection in the bypass wiring 21a to 21m by the vehicle front lighting apparatus 100 according to the present embodiment will be described, and as a preparation, the operation of lighting the LED 1 to the LED 12 by the vehicle front lighting apparatus 100 will be described.

Figure 3A:
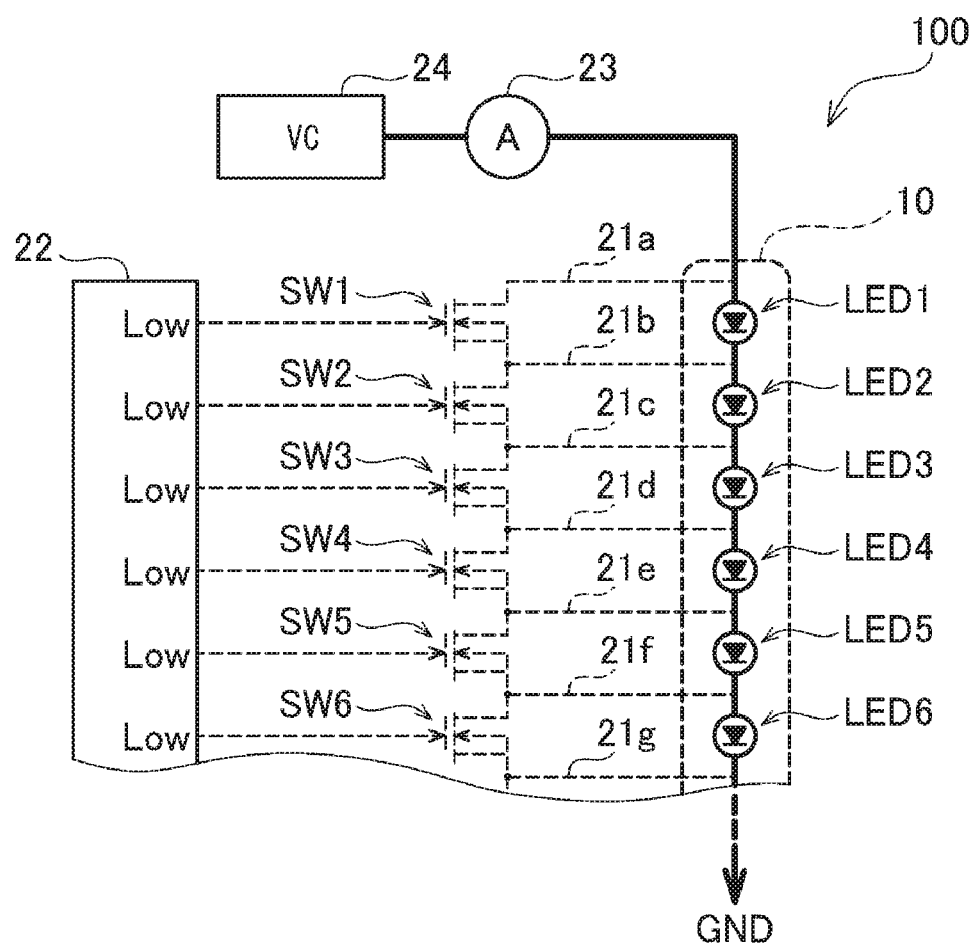
FIG. 3A is an illustrative diagram of an operation of the vehicle front lighting apparatus for lighting multiple LEDs of an LED array at a time.
Figure 3B:
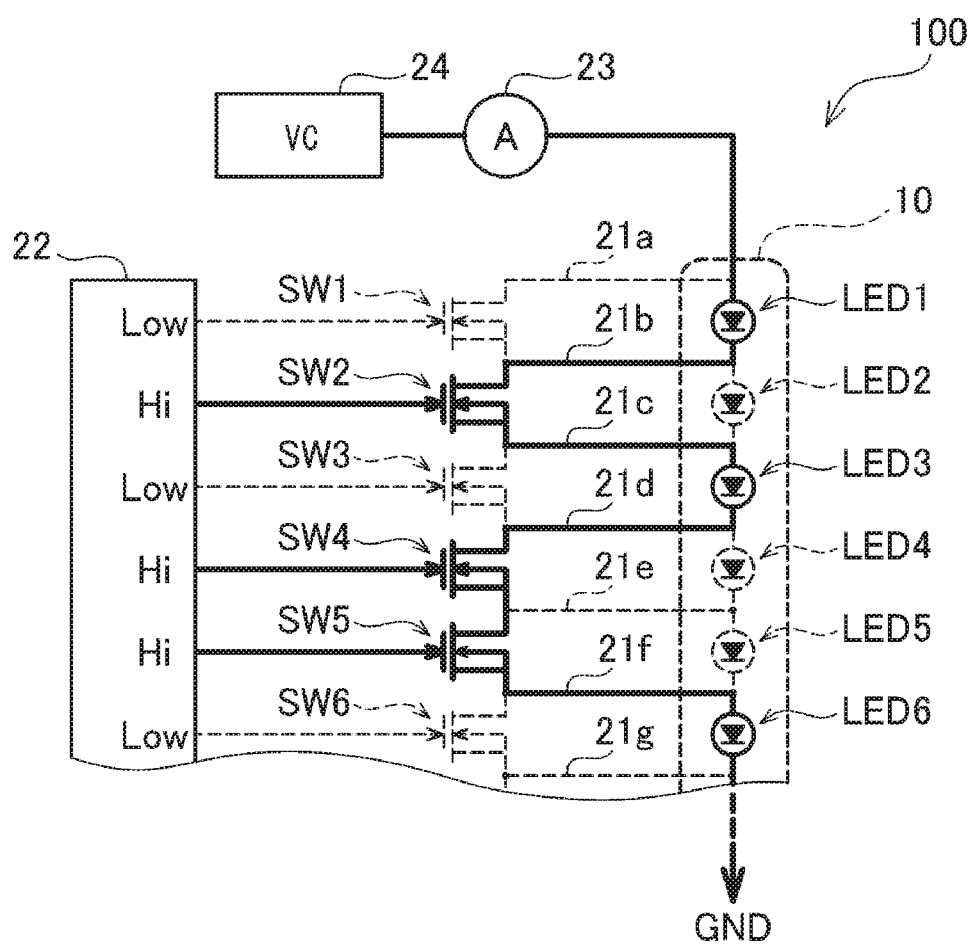
FIG. 3B is an illustrative diagram of an operation of the vehicle front lighting apparatus for individually lighting the multiple LEDs of the LED array.

FIGS. 3A and 3B show the operation of turning on or turning off the LED 1 to the LED 12 by the vehicle front lighting apparatus 100 according to the present embodiment. In the LED array 10, twelve LEDs of the LED 1 to LED 12 are connected in series to each other (see FIG. 2); however, in order to avoid complication of the illustration, the LED 7 to the LED 12 are omitted in FIGS. 3A and 3B. Therefore, in the descriptions in FIGS. 3A and 3B, it is assumed that the LED array 10 includes six LEDs of the LED 1 to the LED 6 connected in series, and the switch elements are also provided with the six switch elements SW1 to SW6.

As shown in FIG. 3A, when the respective control terminals of the switch elements SW1 to SW6 are set to the low state (Low), all of the switch elements SW1 to SW6 are set to a disconnected state. For that reason, when a voltage is applied from the voltage value control unit 24 to the LED array 10, a current flows through the LED 1 to LED 6 as indicated by a thick solid line in the drawing, and the LED 1 to the LED 6 are turned on.

Next, as shown in FIG. 3B, the control terminal of the switch element SW2 is set to the high state (Hi). Then, the switch element SW2 is rendered conductive, and the bypass circuit 21 that bypasses the LED 2 (that is, the bypass wiring 21b, the switch element SW2, and the bypass wiring 21c) is connected to the bypass circuit 21. Since a resistance value of the LEDs is generally larger than a resistance value of the bypass circuit 21, a current flowing through the LED 2 flows through the bypass circuit 21 through the switch element SW2, as a result of which the LED 2 is turned off.

When the control terminals of the switch element SW4 and the switch element SW5 are set to the high state, the switch element SW4 and the switch element SW5 are rendered conductive. As a result, the current flowing through the LED 4 and the LED 5 flows through the bypass circuit 21 (that is, the bypass wiring 21d, the switch element SW4, the switch element SW5, and the bypass wiring 21f) through the switch element SW4 and the switch element SW5, and the LED 4 and the LED 5 are turned off.

In FIG. 3B, a thick solid line represents a path through which a current flows when the control terminals of the switch element SW2, the switch element SW4, and the switch element SW5 are set to the high state. Therefore, in an example shown in FIG. 3B, the light is irradiated from the LED 1, LED 3, and LED 6.

As is clear from FIGS. 3A and 3B, when the lighting control unit 22 sets a control terminal of a certain switch element to the low state, the LED corresponding to the switch element SW is turned on, and conversely, when the control terminal is set to the high state, the LED corresponding to the switch element SW is turned off. Regardless of which LED is turned on, a current value of the current flowing through each LED is a current value detected by the current value detection unit 23.

In an example shown in FIG. 3A, a current flows through six LEDs, but in an example shown in FIG. 3B, a current flows through three LEDs and three switch elements. In this example, since the resistance value of the switch elements is sufficiently smaller than the resistance value of the LEDs, the resistance value of a path through which the current flows is halved by switching from the state of FIG. 3A to the state of FIG. 3B. Therefore, if the voltage value applied by the voltage value control unit 24 is not changed, the value of the current flowing through each LED is doubled. Conversely, in order to keep a value of current flowing through each LED at a predetermined target current value, there is a need to halve the voltage value to be applied by the voltage value control unit 24.

Therefore, the voltage value control unit 24 detects the current value of the LED by the current value detection unit 23, and controls the voltage value to be applied so that the current value reaches the target current value.

In addition, since the current value of the LED is controlled to be a constant target current value in this manner, the luminance of the LED cannot be changed by changing the current value. Therefore, the luminance of the LED is changed by the following method.

Figure 4:
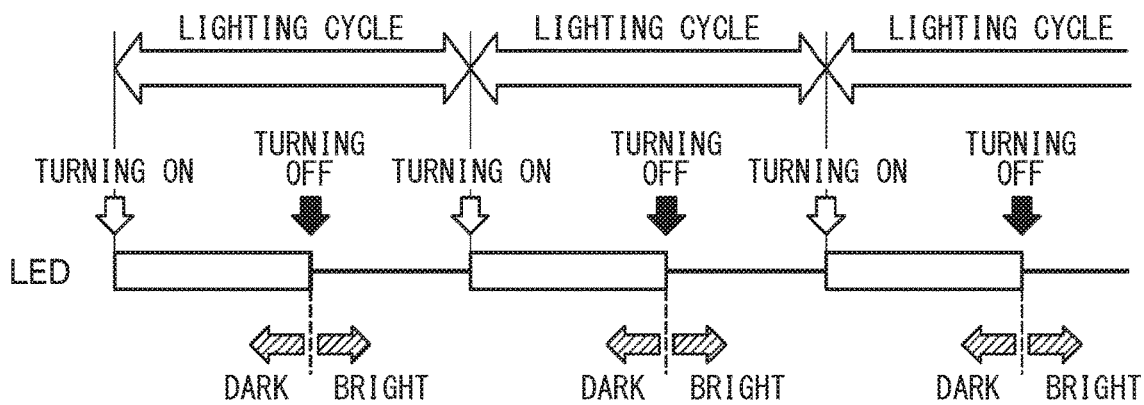
FIG. 4 is an illustrative diagram showing a method of changing the luminance of the LEDs by the vehicle front lighting apparatus.

FIG. 4 shows how the luminance of the illuminated LED is changed. As shown in the figure, the LEDs repeatedly turn on and off within a predetermined lighting cycle. In this example, if the lighting cycle is set to a short period of time which is not recognizable by a human, the human can feel as if the luminance of the LED is reduced by reducing a ratio of a time of lighting within the lighting cycle. On the contrary, if the ratio of the lighting time is increased, the human can feel as if the luminance of the LED is increased.

Therefore, in the vehicle front lighting apparatus 100 according to the present embodiment, the luminance of the LED is changed by changing the timing at which the LED is turned off after the LED is periodically turned on in a predetermined lighting cycle. Incidentally, a state in which the lighting time is "0" in the lighting cycle is turned off, and the lighting state is a state of maximum luminance during the lighting cycle. In the vehicle front lighting apparatus 100 according to the present embodiment, the lighting cycle is set to a time of about 3 msec.

As described above with reference to FIG. 2, the 12 LEDS of the LED 1 to the LED 12 are provided in the LED array 10. In any of the LED 1 to the LED 12, as shown in FIG. 4, the luminance is adjusted by changing a timing at which the LEDs are periodically turned on and then turned off in a predetermined lighting cycle. However, the lighting cycles of the LED 1 to the LED 12 are set to be out of phase with each other, as a result of which the timings at which the LED 1 to the LED 12 are turned on are also different from each other.

Figure 5:
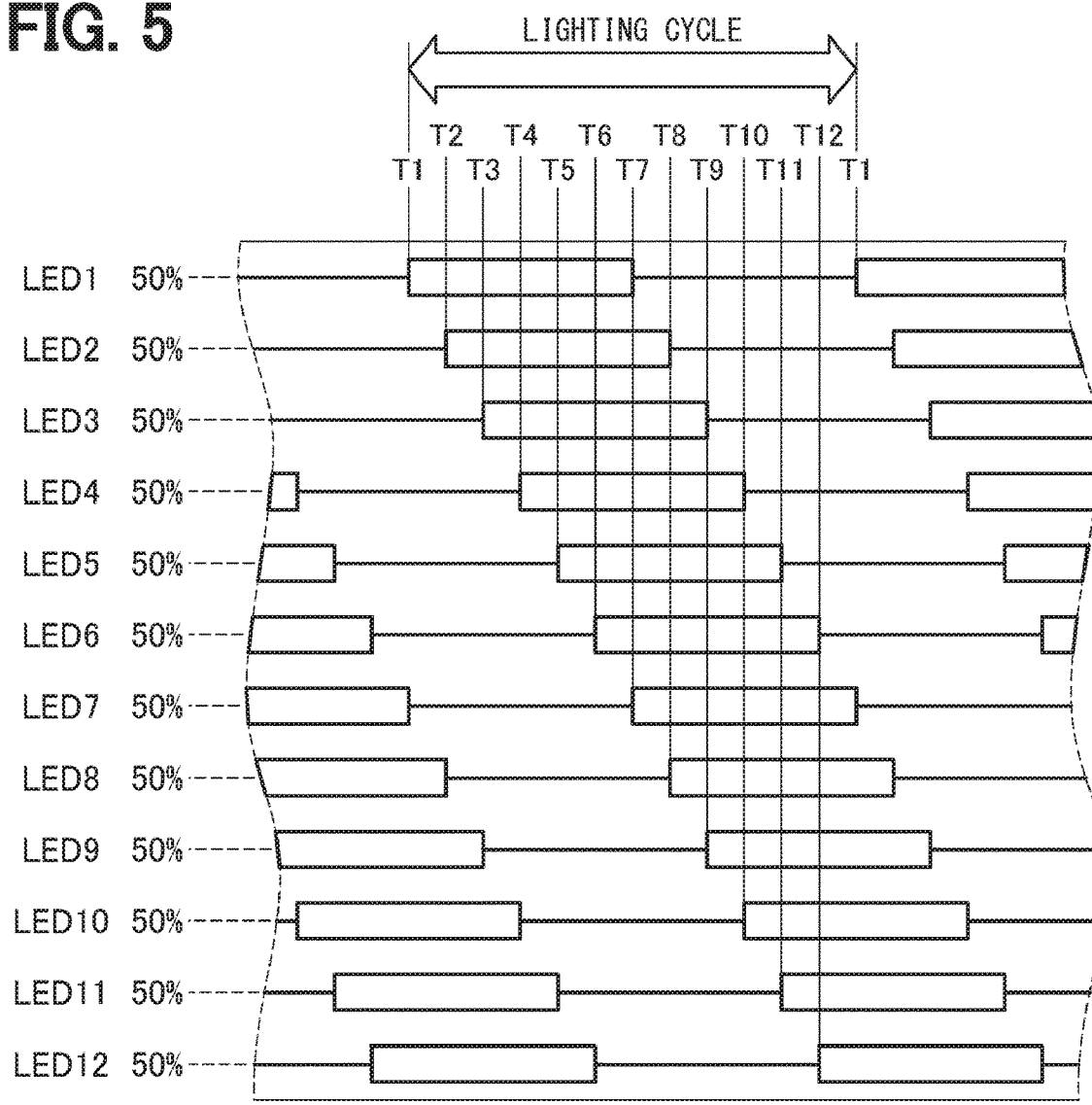
FIG. 5 is an illustrative diagram illustrating a state in which the vehicle front lighting apparatus illuminates a front of the vehicle by lighting the multiple LEDs of the LED array with the same luminance.

FIG. 5 illustrates a state in which the LED 1 to the LED 12 are turned on at different timings from each other. Incidentally, in an example shown in FIG. 5, a lighting duty ratio is set to 50% for each of the LED 1 to the LED 12. Here, the lighting duty ratio represents a ratio of a time during which the LED is turned on to the lighting cycle.

As shown in the figure, the LED 1 is turned on at a timing T1, the LED 2 is turned on at a timing T2, and the LED 3 is turned on at a timing T3. In the same manner, the LED 4 to the LED 12 are turned on sequentially at timings T4 to T12. The LED 1 to the LED 12 turned on in order in this manner are turned off in order at a time when a predetermined time has elapsed since the lighting (in this example, a half of the lighting cycle since the lighting duty ratio is set to 50%). Then, after the lapse of the lighting cycle after the LED 1 is turned on, the LED 1 is turned on again, and then the LED 2 to the LED 12 are turned on in order.

In this example, if the LED 1 to the LED 12 are turned on at a time, the resistance value of a path through which the voltage value control unit 24 causes the current to flow becomes a resistance value of 12 LEDs, so that the voltage value control unit 24 needs to apply a voltage having a large voltage value (see FIG. 3A). Further, when the LED 1 to the LED 12 are turned on at a time, the LED 1 to the LED 12 are turned off at the same time after a period of time corresponding to the lighting duty ratio has elapsed. For that reason, since the resistance value of the path through which the current flows rapidly decreases to the resistance value of the 12 switch elements, there is a need to rapidly decrease the voltage value applied by the voltage value control unit 24. Thereafter, when the LED 1 to the LED 12 are turned on, a voltage value having a large voltage necessaries to be applied. As described above, when the LED 1 to the LED 12 are turned on at a time, the voltage value control unit 24 necessaries to greatly vary the voltage value to be applied.

On the other hand, as illustrated in FIG. 5, when the phases of the lighting cycle of the LED 1 to the LED 12 are shifted from each other, the LED 1 to the LED 12 are turned on in order and then turned off in order, so that the variation of the voltage value applied by the voltage value control unit 24 can be reduced. In particular, in an example shown in FIG. 5, the lighting duty ratio of the LED 1 to the LED 12 is set to 50%, and thus the number of LEDs that are lighting is six at any time. For that reason, the voltage value control unit 24 does not need to change the voltage value.

However, the luminance at which the LED 1 to the LED 12 are turned on changes in accordance with information such as the surrounding state of the vehicle 1, the presence or absence of an oncoming vehicle, a pedestrian, or the like, and information such as the position at which the oncoming vehicle or pedestrian is detected. As described above with reference to FIG. 1B, when the lamp ECU 50 mounted on the vehicle 1 acquires those pieces of information through the in-vehicle LAN 30, the lamp ECU 50 determines the distribution of luminance at which the LED 1 to the LED 12 are turned on (so-called light distribution pattern), and outputs the distribution to the vehicle front lighting apparatus 100. Then, the control module 20 of the vehicle front lighting apparatus 100 determines the timings at which the LED 1 to the LED 12 are turned on and off in accordance with the light distribution pattern.

Figure 6A:
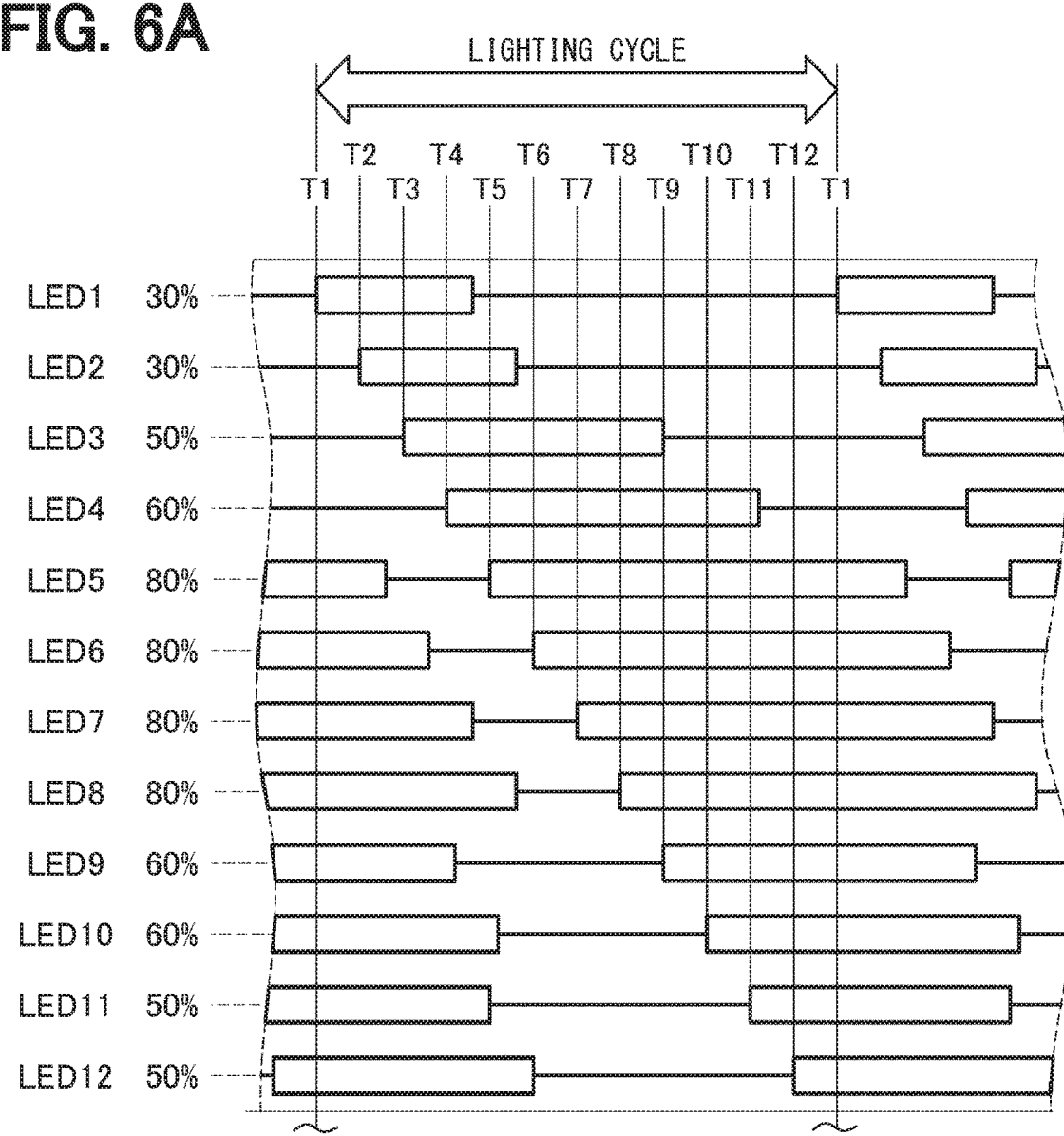
FIG. 6A is a diagram showing timings of turning on and off the multiple LEDs determined in accordance with a light distribution pattern by the vehicle front lighting apparatus.

In FIG. 6A, timings at which the LED 1 to the LED 12 determined according to the light distribution pattern are turned on and off are illustrated. In an example shown in the figure, in a light distribution pattern, the lighting duty ratio of the LED 1 and LED 2 is 30%, the lighting duty ratio of the LED 3 is 50%, the lighting duty ratio of the LED 4 is 60%, the lighting duty ratio of the LED 5 to the LED 8 is 80%, the lighting duty ratio of the LED 9 and the LED 10 is 60%, and the lighting duty ratio of the LED 11 to the LED 12 is 50%.

As described above with reference to FIG. 5, the LED 1 to the LED 12 are turned on sequentially at timings T1 to T12. Since the lighting duty ratio of the LED 1 is 30%, the LED 1 is turned off at a timing when a time corresponding to 30% of the lighting cycle elapses after the LED 1 has been turned on at the timing T1. Since the lighting duty ratio of the LED 2 is 30%, the LED 2 is turned off at a timing when a time corresponding to 30% of the lighting cycle has elapsed after the LED 2 has been turned on at the timing T2. Further, since the lighting duty ratio of the LED 3 is 50%, the LED 3 is turned off at a timing when a time corresponding to 50% of the lighting cycle has elapsed after the LED 3 has been turned on at the timing T3. Hereinafter, in the same manner, the LED 4 to the LED 12 are turned off at a timing when a time corresponding to each lighting duty ratio has elapsed after the LED 4 to the LED 12 have been turned on in order at the timing of T4 to T12. In this manner, the timing at which the LED 1 to the LED 12 are turned on and off can be determined in accordance with the light distribution pattern.

In the present specification, timings at which to turn on and off the LED 1 to the LED 12 determined according to the light distribution pattern are referred to as "lighting schedule". Further, in the present embodiment, since the timing at which the LED 1 to the LED 12 are turned on is determined in advance, actually, the turn-off timing is determined exclusively. However, the timing at which the LED 1 to the LED 12 are turned on may also be changed as required.

After the lighting schedule of the LED 1 to the LED 12 has been determined as described above, the LED 1 to the LED 12 are turned on or off by setting the control terminals of the switch elements SW1 to SW12 to the low state or the high state in accordance with the lighting schedule.

Figure 6B:
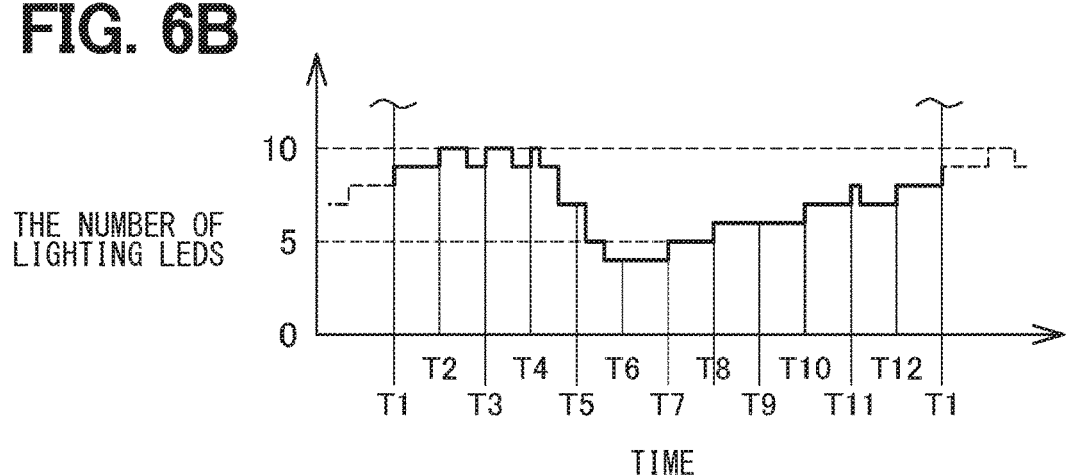
FIG. 6B is a diagram showing a state in which the number of lighting LEDs of the vehicle front lighting apparatus changes with the passage of time.

When the lighting schedule of the LED 1 to the LED 12 is determined, the number of LEDs to be turned on (hereinafter, referred to as the number of lighting LEDs) changes with the passage of time. FIG. 6B shows a state in which the number of lighting LEDs changes every moment with the passage of time.

As described above with reference to FIGS. 3A and 3B, the resistance value of the path through which the current flows is proportional to the number of lighting LEDs. Therefore, when the voltage value of the voltage value control unit 24 is controlled so that the current value detected by the current value detection unit 23 reaches a predetermined target current value while turning on or off the LED 1 to the LED 12 according to the lighting schedule shown in FIG. 6A, the voltage value becomes a voltage value that changes in proportion to the number of lighting LEDs.

Upon receiving the light distribution pattern from the lamp ECU 50, the vehicle front lighting apparatus 100 according to the present embodiment sets the control terminals of the switch elements SW1 to SW12 to the low state or the high state in accordance with the lighting schedule determined as described above. With the above operation, the front of the vehicle 1 can be illuminated with the light distribution pattern designated by the lamp ECU 50.

The LED 1 to the LED 12 of the LED array 10 and the switch elements SW1 to SW12 of the control module 20 are connected to each other by the multiple bypass wirings 21a to 21m. When a disconnection occurs in any of the bypass wirings 21a to 21m, the front side cannot be illuminated with the light distribution pattern designated by the lamp ECU 50, and therefore, if the disconnection occurs, there is a need to be able to detect the disconnection quickly.

On the other hand, as described above, the number of LEDs mounted on the LED array 10 tends to increase year by year, and as the number of LEDs increases, the number of bypass wirings also increases, so that detection of disconnection becomes difficult year by year. Therefore, the vehicle front lighting apparatus 100 according to the present embodiment employs the following method in order to be able to quickly and easily detect the disconnection in the bypass wiring even if the number of LEDs mounted on the LED array 10 increases.

Figure 7A:
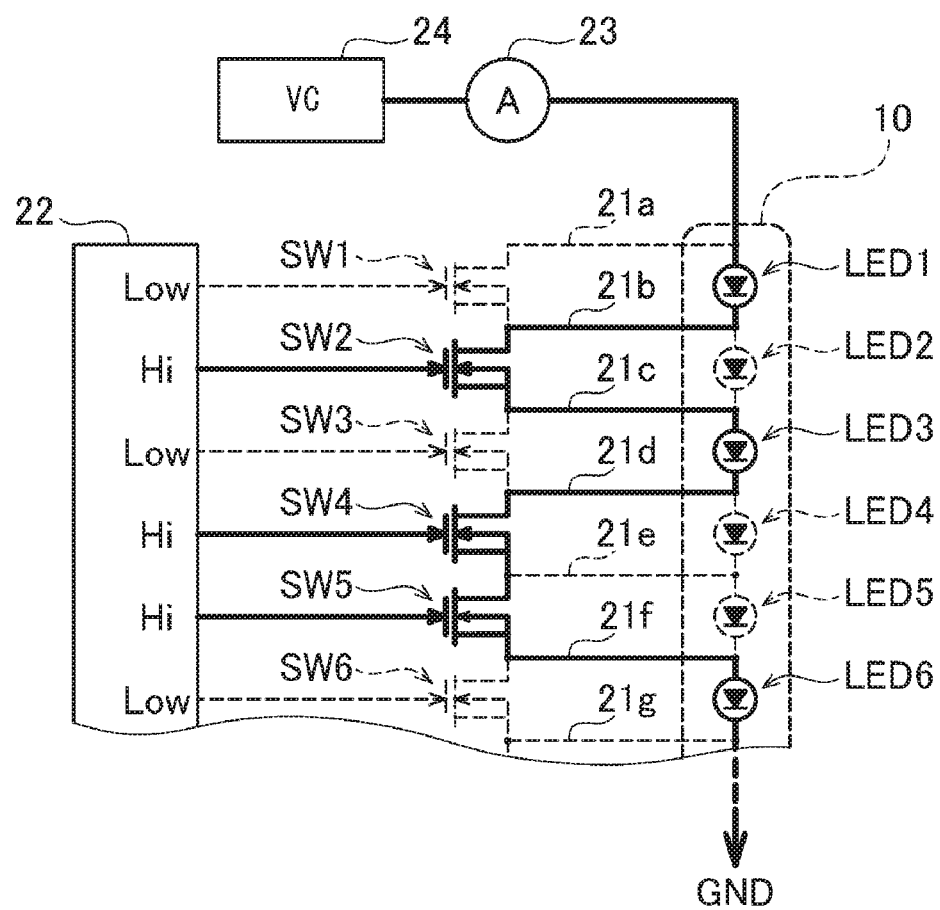
FIG. 7A is an illustrative diagram showing a condition in which no disconnection occurs in the bypass wiring.
Figure 7B:
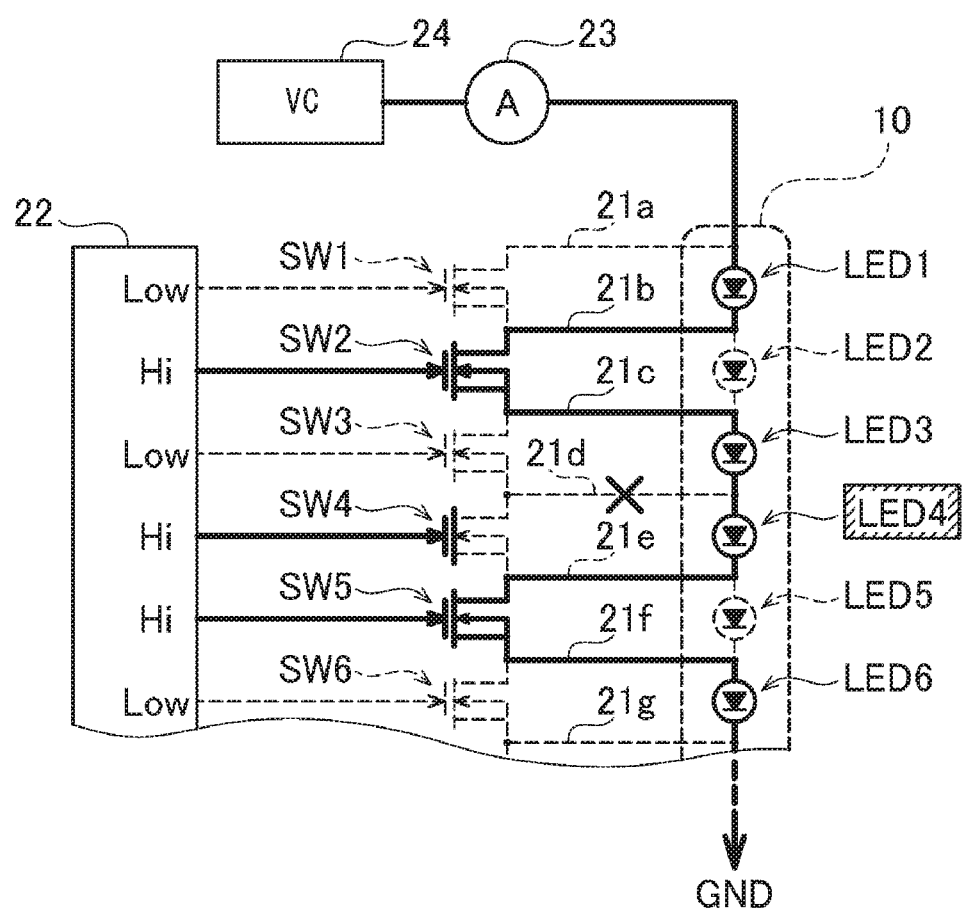
FIG. 7B is an illustrative diagram showing an exemplary effect of the disconnection of the bypass wiring on the operation of lighting the multiple LEDs of the LED array.

FIGS. 7A and 7B exemplify a state in which a path through which a current flows changes due to occurrence of a disconnection in the bypass wiring. As described above, the 12 LEDs of the LED 1 to the LED 12 are connected to the LED array 10 according to the present embodiment, but in order to avoid complication of illustration, the LED 7 to the LED 12 is not illustrated in FIGS. 7A and 7B as in FIGS. 3A and 3B. Correspondingly, in the description in FIGS. 7A and 7B as well, it is assumed that six LEDs of the LED 1 to the LED 6 are connected in series in the LED array 10, and six switches of the element SW1 to the switch element SW6 are provided.

FIG. 7A shows a condition in which disconnection does not occur. As shown in FIG. 7A, when the control terminals of the switch elements SW1, SW3, and SW6 are set to a low state and the control terminals of the switch elements SW2, SW4, and SW5 are set to a high state, a current flows through a path indicated by a thick solid line in the drawing. As a result, the LED 1, the LED 3, and the LED 6 is turned on and the LED 2, the LED 4, and the LED 5 are turned off.

In this situation, it is assumed that a disconnection occurs in the bypass wiring 21d. As shown in FIG. 7A, since the bypass wiring 21d is a path for allowing the current flowing through the LED 4 to bypass the LED 4, if the bypass wiring 21d is disconnected, the current cannot bypass the LED 4. As a result, even though the control terminal of the switch element SW4 is in the high state and the switch element SW4 is in the conductive state, a current flows through the LED 4 and the LED 4 is turned on.

A thick solid line shown in FIG. 7B represents a path through which a current flows at this time. In addition, a mark X in the drawing indicates that a disconnection occurs in the bypass wiring 21d. Further, the LED 4 surrounded in a rectangle in the drawing indicates that the LED 4 is actually turned on although the LED 4 is to be turned off naturally in response to the switch element SW4 being rendered conductive.

In FIG. 7B, a case in which the disconnected bypass wiring 21d is a part of the path for bypassing the LED 4 will be described. When the bypass wiring 21d which allows the current to bypass the LED 4 is disconnected, the current cannot bypass the LED 4 and flows through the LED 4, as a result of which the LED 4 is turned on.

The same applies when the disconnected bypass wiring 21d is a part of the path for bypassing the LED 3.

Figure 8A:
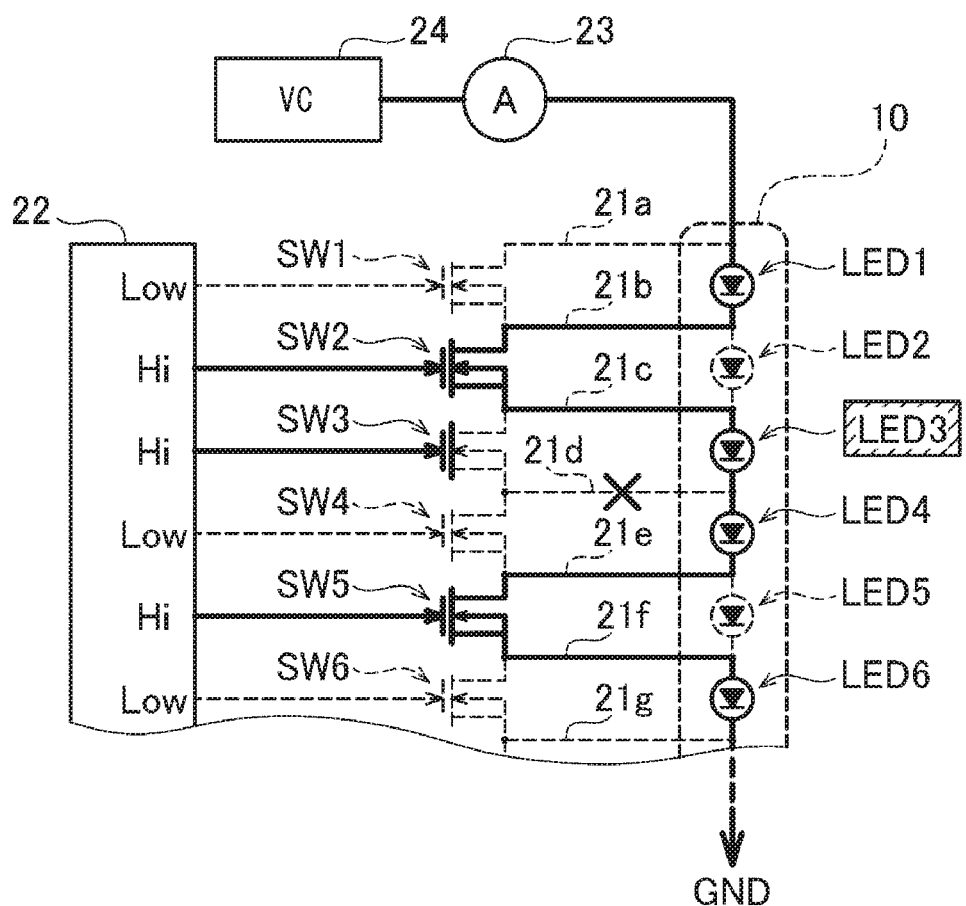
FIG. 8A is an illustrative diagram showing another exemplary effect of the disconnection of the bypass wiring on the operation of lighting the multiple LEDs of the LED array.

FIG. 8A shows a case in which the switch element SW3 on an upstream side of the disconnected bypass wiring 21d is in a conductive state (that is, the control terminal is in a high state), and the switch element SW4 on a downstream side is in a disconnected state (that is, the control terminal is in a low state). Since the switch element SW3 is in the conductive state, the current bypasses the LED 3 originally, but the current cannot bypass the LED 3 because the bypass wiring 21d, which is a part of the bypass path, is disconnected. As a result, a current flows through a path indicated by a thick solid line in FIG. 8A, and the LED 3 is turned on. In FIG. 8A, the LED 3 is indicated by being surrounded by a rectangle, which indicates that the LED 3 is actually turned on even though the LED 3 should be turned off in response to the switch element SW3 being rendered conductive.

Figure 8B:
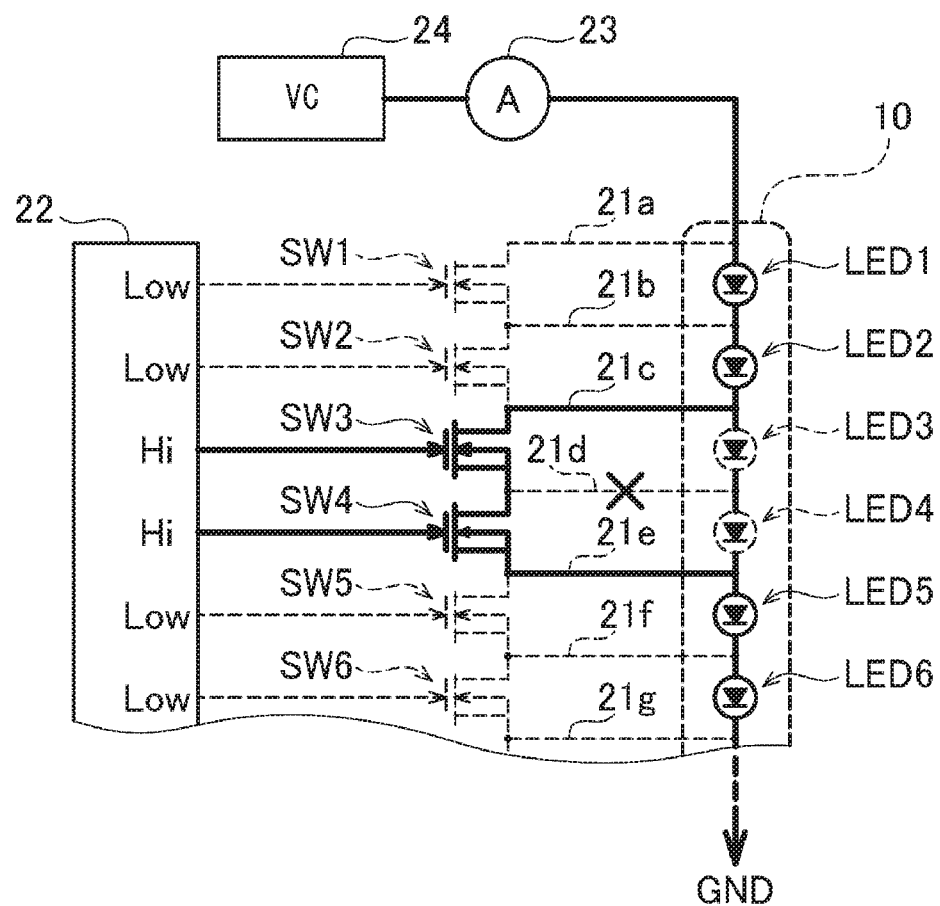
FIG. 8B is an illustrative diagram showing another exemplary effect of the disconnection of the bypass wiring on the operation of lighting the multiple LEDs of the LED array.

On the other hand, FIG. 8B shows a situation in which both the switch element SW3 on the upstream side and the switch element SW4 on the downstream side of the disconnected bypass wiring 21d become rendered conductive. Since the switch element SW3 and the switch element SW4 are rendered conductive, the current bypasses the LED 3 and the LED 4. For that reason, since the bypass wiring 21d drawn from between the LED 3 and the LED 4 does not form a part of a path through which the current bypasses the LED 3 and the LED 4, even if a disconnection occurs in the bypass wiring 21d, the LED 3 and the LED 4 remain turned off.

Contrary to the case shown in FIG. 8B, when both the switch element SW3 on the upstream side and the switch element SW4 on the downstream side of the disconnected bypass wiring 21d are disconnected, the current does not bypass the LED 3 and the LED 4 in the first place. For that reason, since the bypass wiring 21d does not form a part of the bypass path of the current, even if a disconnection occurs in the bypass wiring 21d, the LED 3 and the LED 4 remain turned on.

As is obvious from the above description, when a disconnection occurs in a certain bypass wiring, even if one of the LED on the upstream side and the LED on the downstream side of the bypass wiring is turned on and the other is turned off, both of the LEDs are turned on. When both LEDs are to be turned on or off, both LEDs can be turned on or off as intended.

Therefore, even if it is attempted to turn on and off the LED 1 to the LED 12 according to a predetermined lighting schedule, the number of LEDs actually turned on (hereinafter, referred to as the number of actual lighting LEDs) is larger than the number of lighting LEDs determined according to the lighting schedule if there is a disconnected bypass wiring.

Figure 9A:
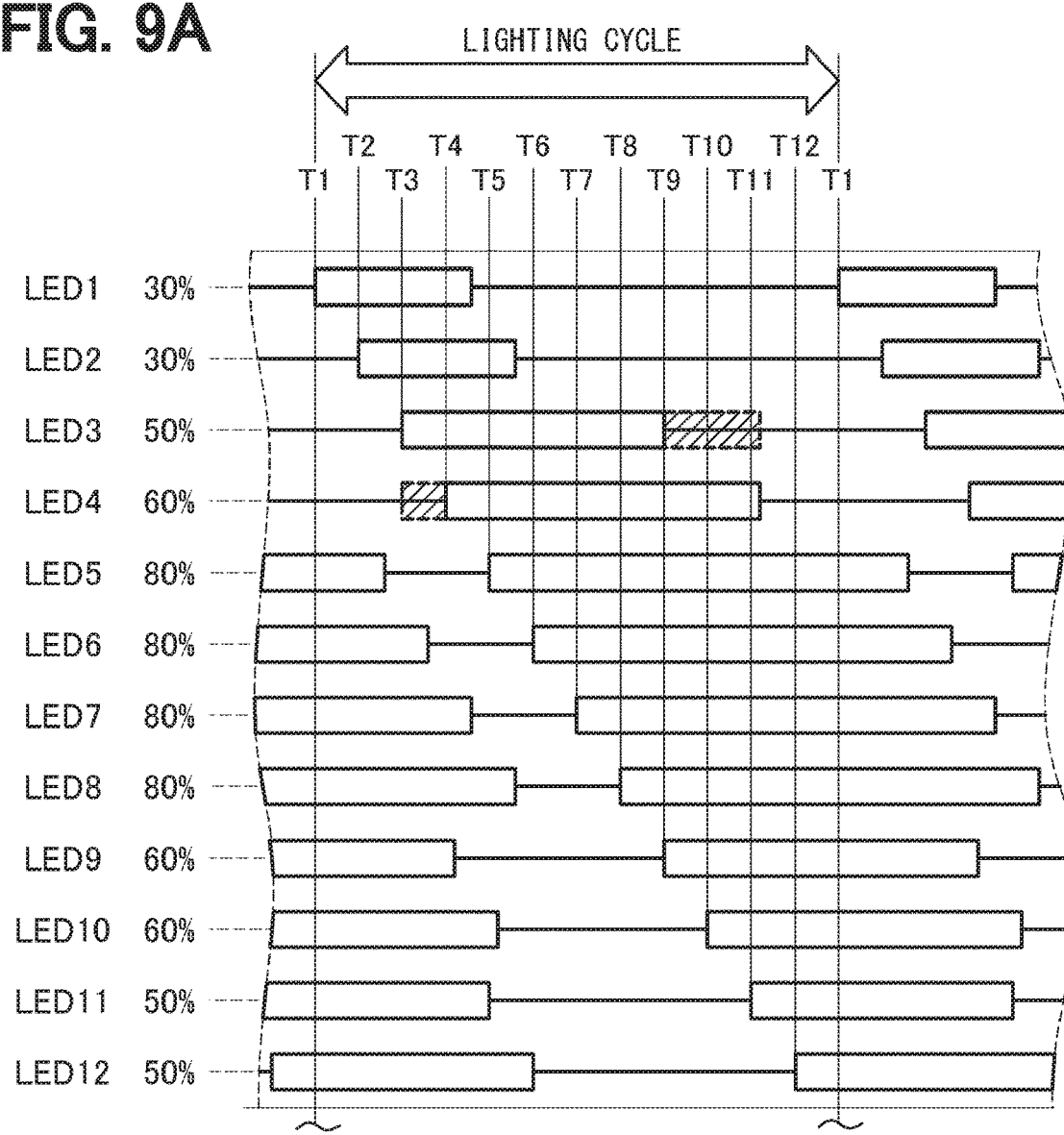
FIG. 9A is an illustrative diagram showing the effect of the disconnection of the bypass wiring on the operation of lighting the multiple LEDs of the LED array.

FIG. 9A illustrates an example in which the LED 1 to the LED 12 is turned on and off according to the lighting schedule shown in FIG. 6A while the bypass wiring 21d led out from between the LED 3 and the LED 4 is disconnected. Hatched portions in FIG. 9A indicate that the LEDs are turned on unintentionally because the bypass wiring 21d is disconnected. For example, the LED 4 is turned on together with the LED 3 because the LED 3 is turned on despite not yet a timing when the LED 4 is turned on. In addition, the LED 3 remains turned on because the LED 4 still remains turned on despite a timing at which the LED 3 is to be turned off.

As a result, the number of actual lighting that the LEDs are actually turned on is larger than the number of lighting LEDs that the LEDs attempt to be turned on according to the lighting schedule. Shaded portions in FIG. 9B indicates the number of lighting LEDs increased due to disconnection.

As described above, the LED 1 to the LED 12 of the LED array 10 are turned on sequentially at the timings T1 to T12. Therefore, it is considered that whether there is a disconnection can be determined by detecting the number of LEDs that are actually lit (that is, the number of actual lighting LEDs) at a timing when a predetermined period of time has elapsed from the timing when the LED 1 to the LED 12 are turned on, and determining whether the number of actual lighting LEDs matches the number of lighting LEDs according to the lighting schedule.

Further, as described above with reference to FIGS. 3A and 3B, since the voltage value applied to the LED array 10 by the voltage value control unit 24 is a voltage value proportional to the number of actual lighting LEDs, the number of actual lighting LEDs can be obtained by detecting the voltage value applied to the LED array 10.

Figure 9B:
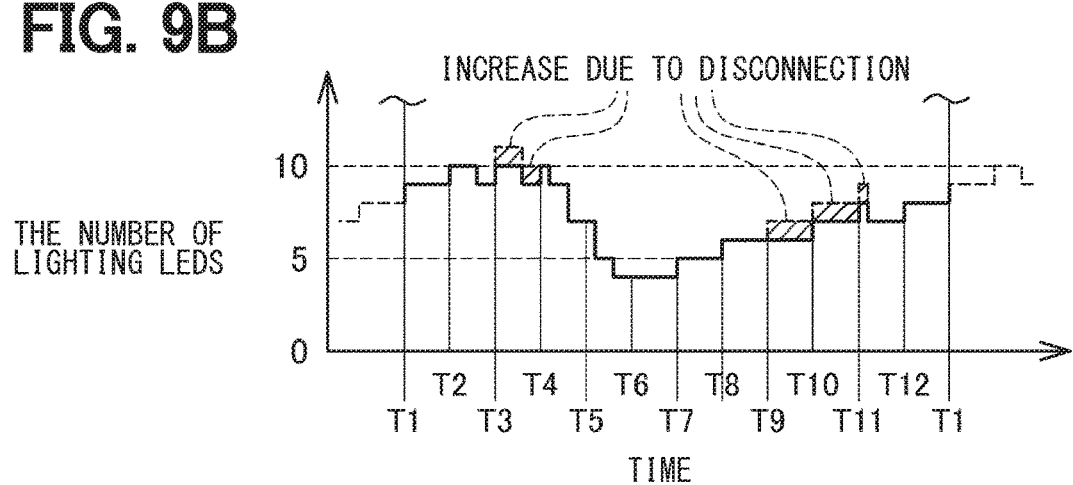
FIG. 9B is an illustrative diagram showing the effect of the disconnection of the bypass wiring on the number of lighting LEDs of the vehicle front lighting apparatus.
Figure 10A:
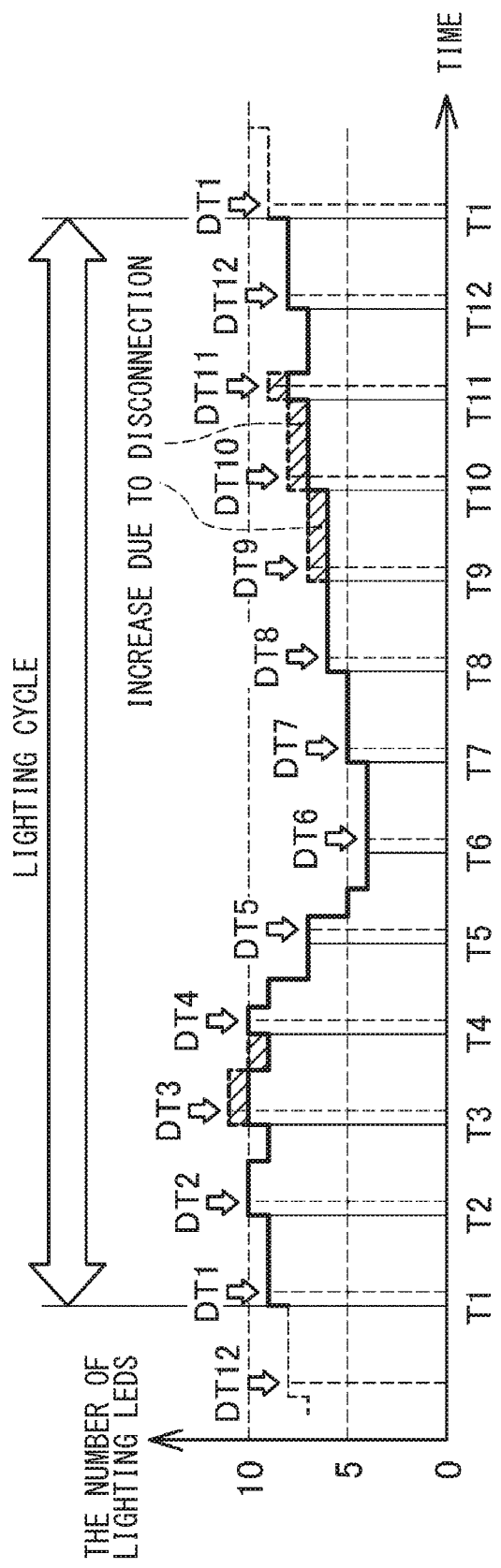
FIG. 10A is an illustrative view of a principle of detecting whether there is a disconnection in the bypass wiring by the vehicle front lighting apparatus.

FIG. 10A shows FIG. 9B with a time axis enlarged. A thick solid line in the figure represents the number of lighting LEDs according to the lighting schedule, and hatched portions in the figure represent portions in which the number of lighting LEDs is increased due to an influence of disconnection. In addition, T1 to T12 shown on a horizontal axis in the drawing indicate timings at which the LED 1 to the LED 12 are turned on.

FIG. 10B is obtained by calculating the number of lighting LEDs due to the lighting schedule and the number of actual lighting LEDs at timings of DT1 to DT12 in which a predetermined time has elapsed from the timings of T1 to T12 (hereinafter, referred to as detection timings).

As shown in FIG. 10B, at the detection timing of DT3, the number of lighting LEDs according to the lighting schedule is 10, while the number of actual lighting LEDs is 11, so that the number of lighting LEDs according to the lighting schedule does not match the number of actual lighting LEDs. Since there is only a need to count the number of switch elements SW whose control terminals are in the low states at the timing of DT3, the number of lighting LEDs according to the lighting schedule can be obtained immediately.

The number of lighting LEDs can be obtained according to a voltage value applied to the LED array 10. In other words, when it is assumed that a resistance value per LED is R, the number of actual lighting LEDs is N, a target current value flowing through each of the LEDs of the LED array 10 is I, and a voltage value applied to the LED array 10 by the voltage value control unit 24 is V, the following expression is satisfied.

$$V = I \cdot (N \cdot R) \quad (1)$$

In this example, (N·R) is a resistance value of the entire LED array 10 as viewed from the voltage value control unit 24. Since V can be actually measured and I and R are given in advance, it is considered that the number of actual lighting LEDs N can be calculated.

Actually, however, there is a variation in the resistance value R of the LEDs. Therefore, when the multiple lighting LEDs happen to be LEDs having a large resistance value or LEDs having a small resistance value, a large error occurs in the resistance value of the entire LED array 10 as viewed from the voltage value control unit 24. When the number of lighting LEDs increases and an error in the resistance value becomes a magnitude corresponding to the resistance value of one LED, there is a possibility that the erroneous number of actual lighting LEDs is obtained by calculating the number of actual lighting LEDs by use of Expression (1).

Figure 11:
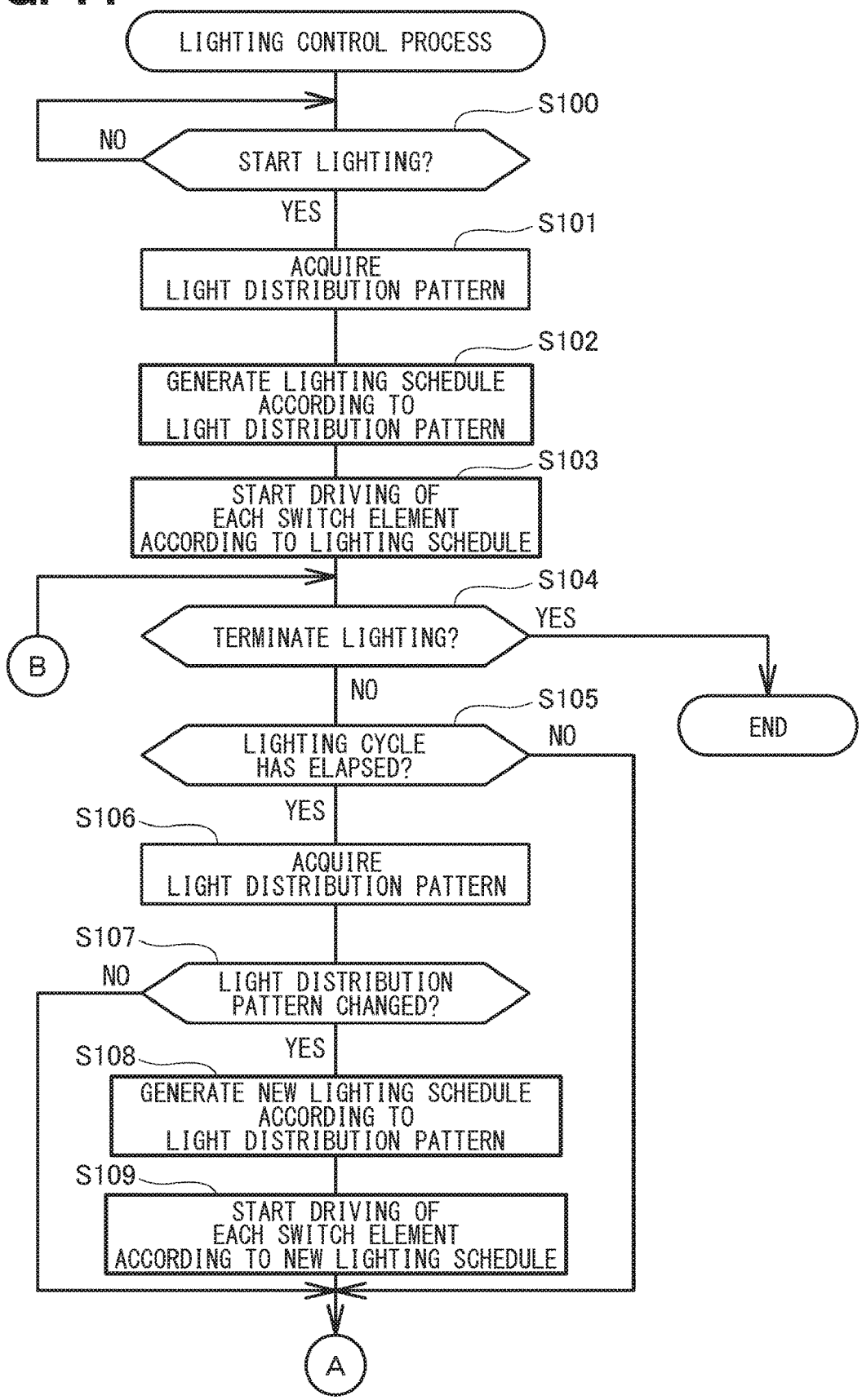
FIG. 11 is a flowchart showing a first half of a lighting control process executed by the vehicle front lighting apparatus.

For example, at the timing of DT3 in FIG. 10B, 11 LEDs are actually turned on, but if the resistance values of those LEDs happen to be small, the number of actual lighting LEDs is erroneously calculated to be 10, and the occurrence of disconnection may not be detected. At the timings of DT2 and DT4, 10 LEDs are turned on, but if the resistance values of those LEDs happen to be large, the number of actual lighting LEDs is erroneously calculated to be 11, and the occurrence of disconnection may be erroneously detected.

At the timings of DT9, DT10, and DT11, the number of lighting LEDs is reduced compared to the timing of DT3, so that the possibility of erroneously detecting whether there is a disconnection is reduced, but if a variation in the resistance value of the LEDs becomes large, there is still a possibility of erroneous detection.

In addition, as described above, it is expected that the number of LEDs forming the LED array 10 increase, so that the number of lighting LEDs is considered to also increase, resulting in a possibility of erroneously detecting whether there is a disconnection.

Therefore, not the number of lighting LEDs and the number of actual lighting LEDs at each detection timing DT, but the amount of change in the number of lighting LEDs and the number of actual lighting LEDs will be focused. In other words, when the number of lighting LEDs and the number of actual lighting LEDs are detected at a certain detection timing DT, the number of lighting LEDs and the number of actual lighting LEDs are compared with the number of lighting LEDs and the number of actual lighting LEDs detected at a previous detection timing DT, and the amount of change in the number of lighting LEDs and the amount of change in the number of actual lighting LEDs are calculated.

FIG. 10C shows the amount of change in the number of lighting LEDs and the amount of change in the number of actual lighting LEDs obtained in this manner. For example, the amount of change in the number of lighting LEDs and the number of actual lighting LEDs match each other as "+1" between the timing of DT1 and the timing of DT2, but the amount of change in the number of lighting LEDs and the amount of change in the number of actual lighting LEDs do not match each other between the timing of DT2 and the timing of DT3. In the same manner, the amount of change in the number of lighting LEDs and the amount of change in the number of actual lighting LEDs do not match each other between the timing of DT3 and the timing of DT4, between the timing of DT8 and the timing of DT9, and between the timing of DT11 and the timing of DT12. The mismatch in the amount of change occurs because, as shown in FIG. 10B, portions in which the number of lighting LEDs and the number of actual lighting LEDs are different from each other occur. Therefore, instead of detecting the number of lighting LEDs and the number of actual lighting LEDs to determine whether those numbers match each other, it may be determined whether the amount of change in the number of lighting LEDs and the amount of change in the number of actual lighting LEDs match each other, or mismatch each other.

As is clear from a comparison between FIG. 10B and FIG. 10C, since the amount of change in the number of actual lighting LEDs becomes smaller than the amount of change in the number of actual lighting LEDs, a variation in the resistance value of the LEDs is less likely to be affected. For example, it is assumed that the resistance value of the LEDs varies by about ±10% of the design resistance value. At this time, if 10 lighting LEDs shown in FIG. 10B happen to be LEDs having a large resistance value, there is a possibility that the number of actual lighting LEDs is erroneously detected as 11. On the other hand, as shown in FIG. 10C, in the case of the amount of change in the number of actual lighting LEDs, "−3" is not erroneously detected as "−2" or "−4". As described above, if attention is paid to the amount of change in the number of lighting LEDs to be turned on and the amount of change in the number of actual lighting LEDs that have been actually turned on, whether there is a disconnection can be surely detected even if the number of LEDs forming the LED array 10 increases.

Therefore, the vehicle front lighting apparatus 100 according to the present embodiment detects whether there is a disconnection in the bypass wirings 21a to 21m connecting the LED array 10 and the control module 20 based on the above principle.

Figure 12:
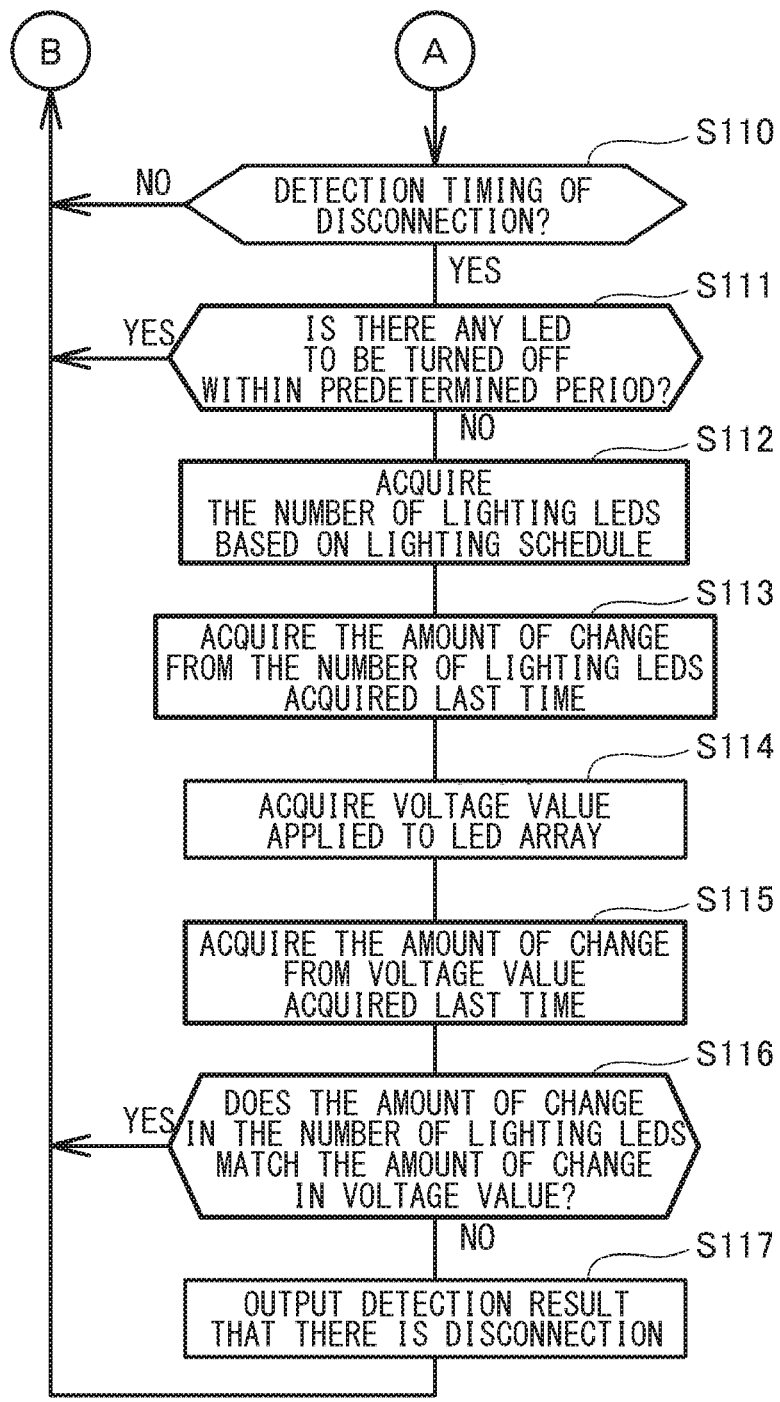
FIG. 12 is a flowchart showing a second half of the lighting control process executed by the vehicle front lighting apparatus.

FIG. 11 and FIG. 12 are flowcharts of a lighting control process to be executed by the vehicle front lighting apparatus 100 according to the present embodiment to illuminate the region in front of the vehicle 1 by use of the LED array 10.

As shown in the figure, when the lighting control process is started, first, it is determined whether to start lighting by use of the LED array 10 (S100). In the present embodiment, the lamp ECU 50 determines whether the lighting is required based on the information acquired from the in-vehicle LAN 30, and outputs the result to the vehicle front lighting apparatus 100. Therefore, when an instruction to start lighting is not received from the lamp ECU 50, it is determined that lighting is not to be started (NO in S100), and the lighting control process is in a waiting state while repeating the same determination until the instruction to start lighting is received.

When an instruction to start lighting is received, it is determined to start lighting (YES in S100), and the light distribution pattern are acquired from the lamp ECU 50 (S101). As described above, the light distribution pattern is information indicating the luminance at which the plurality of LEDs of the LED array 10 are turned on.

Next, a lighting schedule corresponding to the light distribution pattern is generated (S102). As described above, the lighting schedule is data indicating a schedule of timings at which the multiple LEDs forming the LED array 10 are turned on and turned off. As exemplified in FIG. 6A, when the light distribution pattern is a pattern in which a lighting duty ratio of the LED 1 and the LED 2 is 30%, the lighting duty ratio of the LED 3 is 50%, the lighting duty ratio of the LED 4 is 60%, the lighting duty ratio of the LED 5 to the LED 8 is 80%, the lighting duty ratio of the LED 9 and the LED 10 is 60%, and the lighting duty ratio of the LED 11 to the LED 12 is 50%, the lighting schedule as shown in FIG. 6A is generated.

Then, according to the generated lighting schedule, driving of the switch elements SWs corresponding to the respective LEDs is started (S103). In other words, in accordance with the lighting schedule, the operation of setting the control terminal of the switch element SW of the LED to be turned on to the low state, and setting the control terminal of the switch element SW of the LED to be turned off to the high state is repeated in the lighting cycle of the LED.

Next, it is determined whether an instruction is given from the lamp ECU 50 to terminate the lighting (S104), and when no instruction is given from the lamp ECU 50 to terminate the lighting, it is determined that the lighting is not terminated (NO in S104), and it is then determined whether the lighting cycle has elapsed (S105).

When the lighting cycle has not yet elapsed since the driving of the switch elements SW is started, a determination of "NO" is made in S105, and it is determined whether the present timing is the disconnection detection timing DT (S110 in FIG. 12). As described above with reference to FIGS. 10A to 10C, the detection timing DT is set to a timing at which a predetermined interval period IT has elapsed from a timing at which each LED of the LED array 10 is turned on. The reason why the disconnection detection timing DT is set to such a timing is that a certain amount of time is required for the voltage value control unit 24 to change the voltage value.

Figure 13:
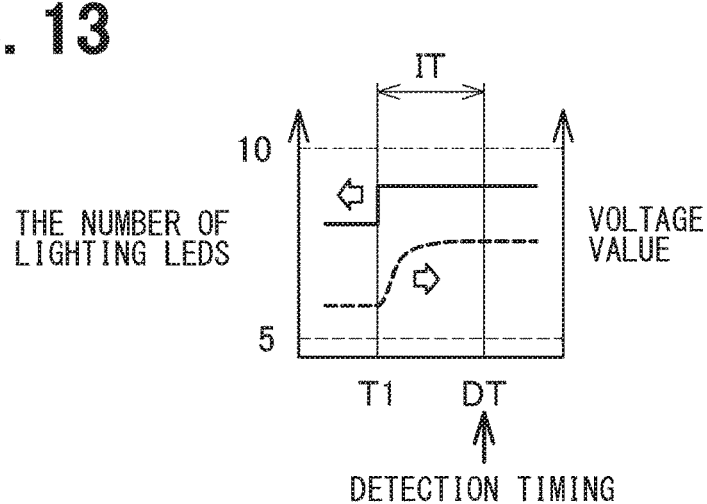
FIG. 13 is an illustrative diagram of a detection timing DT for detecting whether there is a disconnection during the lighting control process.

FIG. 13 illustrates a temporal change in the voltage value applied to the LED array 10 by the voltage value control unit 24 when the LED 1 is turned on at the timing of T1. As shown in the figure, even if the number of lighting LEDs is switched to another, a time delay occurs in the change of the voltage value. This is because the voltage value control unit 24 controls the voltage value so that the current value detected by the current value detection unit 23 reaches the target current value. Therefore, a time required for the voltage value to stabilize with a margin (that is, an interval period IT) is determined in advance, and a timing at which the interval period IT has elapsed from the timings T1 to T12 at which the LED 1 to the LED 12 are turned on is set as a disconnection detection timing DT. With the above setting, erroneous determination of the disconnection due to detection of a voltage value before stabilization can be avoided.

When the interval period IT has not elapsed from the timings T1 to T12 at which the LED 1 to the LED 12 are turned on, it is determined that the timing is not the disconnection detection timing (No in S110 of FIG. 12), and the flow returns to S104 in FIG. 11 where it is determined whether the lighting is to be terminated. As a result, when the lighting is not finished (NO in S104), it is determined whether the lighting cycle has elapsed (S105), and when the lighting cycle has not elapsed (NO in S105), it is again determined whether the timing comes to the disconnection detection timing (S110 in FIG. 12).

Even while the above operation is repeated, the driving of the switch elements SWs started in S103 in FIG. 11 is continued according to the lighting schedule.

As a result, since it is determined that the present timing comes to the disconnection detection timing DT (YES in S110 in FIG. 12), it is then determined whether there are LEDs which turn off within a predetermined period (S111). In this example, the predetermined period is set to a time obtained by adding a predetermined margin time dT (a time shorter than the interval period IT) to the interval period IT.

Then, if there is no LED to be turned off within the predetermined period (NO in S111), the following operation is started to detect whether there is a disconnection, but if there is an LED to be turned off within the predetermined period (YES in S111), it is determined whether to terminate lighting without detecting disconnection (S104 in FIG. 11). The reason why the operation is made different depending on whether there is an LED which is turned off within a predetermined period is as follows.

Figure 14:
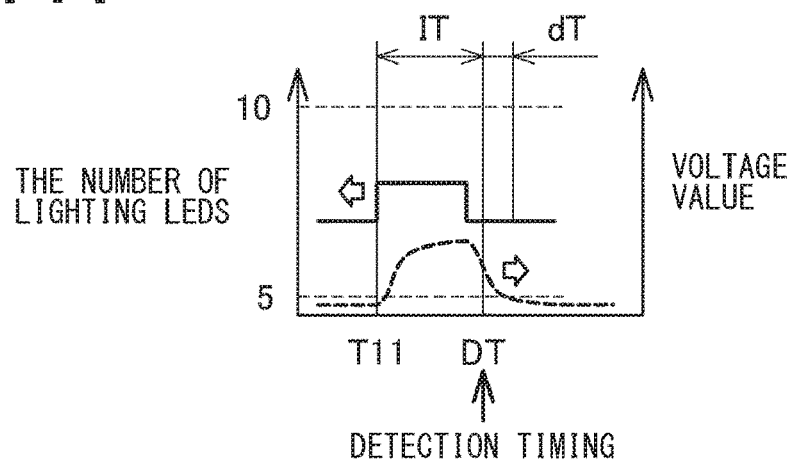
FIG. 14 is an illustrative diagram showing a reason why a predetermined period for determining whether there is an LED to be turned off is set.

FIG. 14 shows an enlarged view of a change in the number of lighting and a change in the voltage value to be applied before and after the timing of T11. As described above with reference to FIGS. 6A and 6B, since the timing of T11 is the timing at which the LED 11 is turned on, the number of lighting LEDs is increased by one, as a result of which, the value of the applied voltage is increased as indicated by a dashed line in FIG. 14. However, before the voltage value is stabilized (that is, before the detection timing DT comes), the other LEDs are turned off and the number of lighting LEDs is decremented by one. As a result, the increased voltage value changes to decrease.

Therefore, when there is an LED which is turned off during the period from the lighting timing (T11 in this example) to the elapse of the interval period IT, if the voltage value is detected at the disconnection detection timing DT, the voltage value during the decrease is detected, so that a correct voltage value cannot be detected.

It is also assumed that there is an LED which turns off just at the detection timing DT. Considering that it takes some time to detect the voltage value, in this case, the voltage value starts decreasing while the voltage value is being detected, and the correct voltage value cannot be detected. Therefore, if there is an LED which is turned off during a period from the detection timing DT until the elapse of a margin time dT with the time required for detecting the voltage value as the margin time dT, there is a possibility that the correct voltage value cannot be detected.

Therefore, in S111 of FIG. 12, it is determined whether there is an LED which is turned off within a predetermined period from any of the lighting timings T1 to T12 until an interval period IT and a margin time dT elapse. Then, if there is an LED to be turned off (YES in S111), it is determined that there is a possibility that correct voltage values cannot be detected, and the flow returns to S104 of FIG. 11 without detecting whether there is a disconnection, and it is determined whether to terminate the lighting.

In addition, since the LED 1 to the LED 12 are turned on and off in accordance with a lighting schedule generated in accordance with the light distribution pattern (see FIGS. 6A and 6B), it can be easily determined whether there are an LED which is turned off within a predetermined period with reference to the lighting schedule.

Since the margin time dT described above is actually sufficiently shorter than the interval period IT, the margin time dT may be simply ignored. In this instance, in S111 of FIG. 12, it is determined whether there is an LED to be turned off during a period from the lighting timing of any one of T1 to T12 until the interval period IT elapses (that is, until the disconnection detection timing DT comes).

As a result, when there is no LED to be turned off within the predetermined period (NO in S111), the number of LEDs to be turned on (that is, the number of LEDs to be turned on) is acquired (S112). The number of lighting LEDs can be obtained based on the lighting schedule.

Next, the amount of change from the number of lighting acquired at a previous timing is acquired (S113). As described above, when there is an LED that turn off within the predetermined period (YES in S111), the number of lighting LEDs is not acquired, and therefore, the number of lighting LEDs acquired before the predetermined period becomes the number of lighting LEDs acquired at the previous timing, and the amount of change from the number of lighting LEDs is acquired.

In this manner, when the amount of change in the number of lighting LEDs is acquired, the value of the voltage applied to the LED array 10 is acquired (S114).

Next, the amount of change from the voltage value acquired at the previous timing is acquired (S115). As described above, when there is an LED which is turned off within the predetermined period (YES in S111), the voltage value is not acquired in the same manner as the number of LEDs which are turned on, and therefore, the amount of change from the previously acquired voltage value is also acquired.

Then, it is determined whether the amount of change in the number of lighting LEDs acquired in S113 matches the amount of change in the voltage value acquired in S115 (S116). In other words, if the amount of change in the number of lighting LEDs acquired in S113 is dN, the average resistance value of the LEDs is R, a variation of the resistance value is dR, and a target current value flowing through the LEDs is I, the amount of change in the voltage value dV applied to the LED arrays 10 should fall within the following range.

$$dN \cdot (R-dR) \cdot I < dV < dN \cdot (R+dR) \cdot I \qquad (2)$$

Therefore, when the amount of change in the voltage value acquired in S115 falls within a range satisfying Expression (2), it is determined that the amount of change in the number of lighting LEDs matches the amount of change in the voltage value (YES in S116), and when the amount of change in the number of lighting LEDs does not fall within the range satisfying Expression (2), it is determined that the amount of change in the number of lighting LEDs does not match the amount of change in the voltage value (NO in S116).

As a result, when it is determined that the amount of change in the number of lighting LEDs and the amount of change in the voltage value do not match each other (NO in S116), the detection result that "there is a disconnection" is output to the outside (for example, the lamp ECU 50 in FIG. 1B) (S117), the flow returns to S104 in FIG. 11, and it is determined whether to terminate the lighting.

On the other hand, when it is determined that the amount of change in the number of lighting LEDs and the amount of change in the voltage value match each other (YES in S116), the flow returns to S104 in FIG. 11 as it is without outputting the detection result, and it is determined whether the lighting is to be terminated.

As described above, in the lighting control process according to the present embodiment, when the driving of the switch elements SWs is started (S103) according to the lighting schedule corresponding to the light distribution pattern, whether there is a disconnection is detected by repeating the operation described above (S116 and S117 in FIG. 12).

When the lighting cycle has elapsed while repeating the above operation (YES in S105 of FIG. 11), the light distribution pattern is acquired from the lamp ECU 50 (S106).

Then, it is determined whether the newly acquired light distribution pattern has been changed from the previously acquired light distribution pattern (S107). As a result, when there is no change in the light distribution pattern (NO in S107), the series of processes described above (S110 to S117 in FIG. 12) is repeated until the lighting cycle has elapsed and the determination of "YES" is made in S105.

On the other hand, when the newly acquired light distribution pattern is changed from the previously acquired light distribution pattern (YES in S107), a new lighting schedule corresponding to the new light distribution pattern is generated (S108). After the driving of the switch elements SW is started according to the new lighting schedule (S109), it is determined whether the present timing is the disconnection detection timing DT (S110 in FIG. 12), and then the series of operations (S111 to S117) described above are repeated. Those operations are repeated until the lighting is terminated (YES in S104) or until the lighting cycle has elapsed (YES in S105).

When it is finally determined that the lighting is to be terminated (YES in S104 of FIG. 11), the lighting control process in FIGS. 11 and 12 is terminated.

As described above, the vehicle front lighting apparatus 100 according to the present embodiment can detect the occurrence of the disconnection quickly when the disconnection occurs in the bypass wirings 21*a* to 21*m* for controlling the lighting operation of the respective LEDs of the LED array 10 by performing the lighting control process described above.

Further, in detecting the disconnection, it is only necessary to determine whether the amount of change in the number of lighting LEDs to be turned on in the LED array 10 matches the amount of change in the voltage value to be applied to the LED array 10, so that whether there is a disconnection can be detected easily and quickly.

MODIFICATIONS

In the above embodiments, there are the following modifications. Hereinafter, modifications will be briefly described focusing on differences from the present embodiment.

In the embodiment described above, the number of lighting LEDs to be turned on and the voltage value to be applied to the LED array 10 are detected at predetermined detection timings DT after the LED 1 to the LED 12 are turned on, and the amount of change in the number of lighting LEDs and the amount of change in the voltage value are acquired.

Alternatively, the number of lighting LEDs and the voltage value are detected at a predetermined detection timing set before and after a timing at which the LED 1 to the LED 12 are turned on as a reference, so that the amount of change in the number of lighting LEDs and the amount of change in the voltage value may be acquired.

Figure 15:
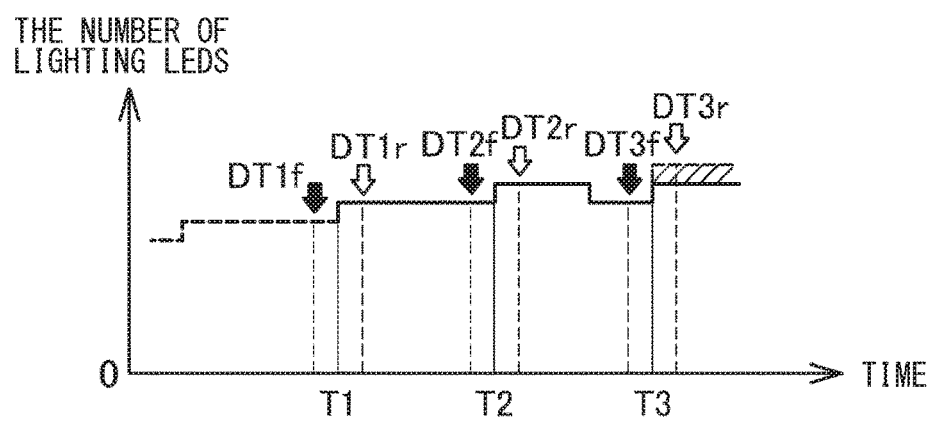
FIG. 15 is an illustrative diagram illustrating a detection timing DT for detecting a disconnection position in a lighting control process according to a modification.

For example, as illustrated in FIG. 15, a detection timing DT1*f* set prior to lighting and a detection timing DT1*r* set after lighting are set for the timing of T1 at which the LED 1 is turned on. A detection timing DT2*f* before lighting and a detection timing DT2*r* after lighting are also set for the timing of T2 for lighting the LED 2. Hereinafter, similarly, detection timings DT3*f* to DT12*f* before lighting and detection timings DT3*r* to DT12*r* after lighting are set for the timings T3 to T12 at which the LED 3 to the LED 12 are turned on. The number of lighting LEDs and the voltage value may be detected before and after turning on the LED, and the amount of change in the number of lighting LEDs and the amount of change in the voltage value may be acquired to determine whether there is a disconnection.

Figure 16:
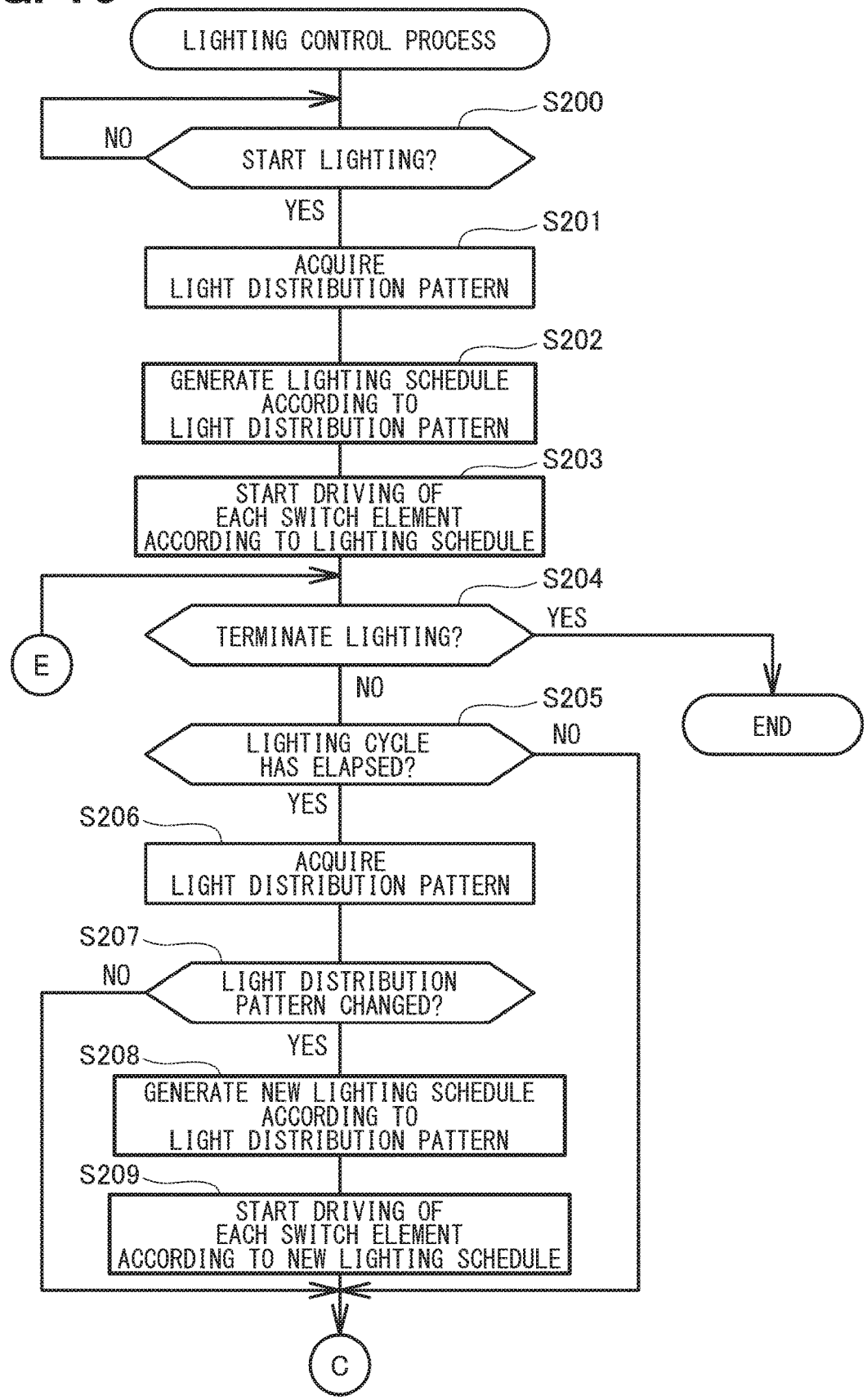
FIG. 16 is a flowchart showing a first half of the lighting control process according to the modification.
Figure 17:
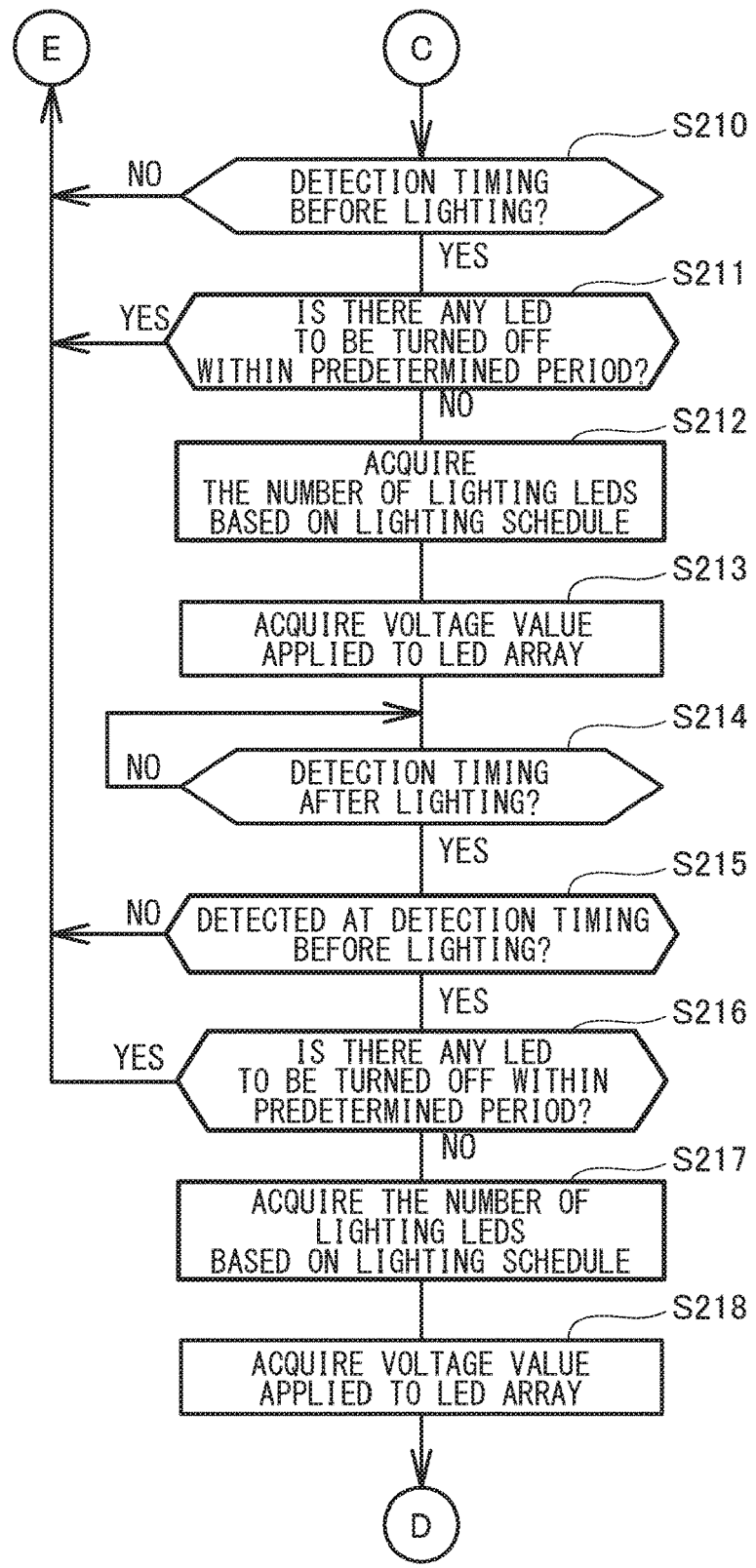
FIG. 17 is a flowchart showing an intermediate portion of the lighting control process according to the modification.
Figure 18:
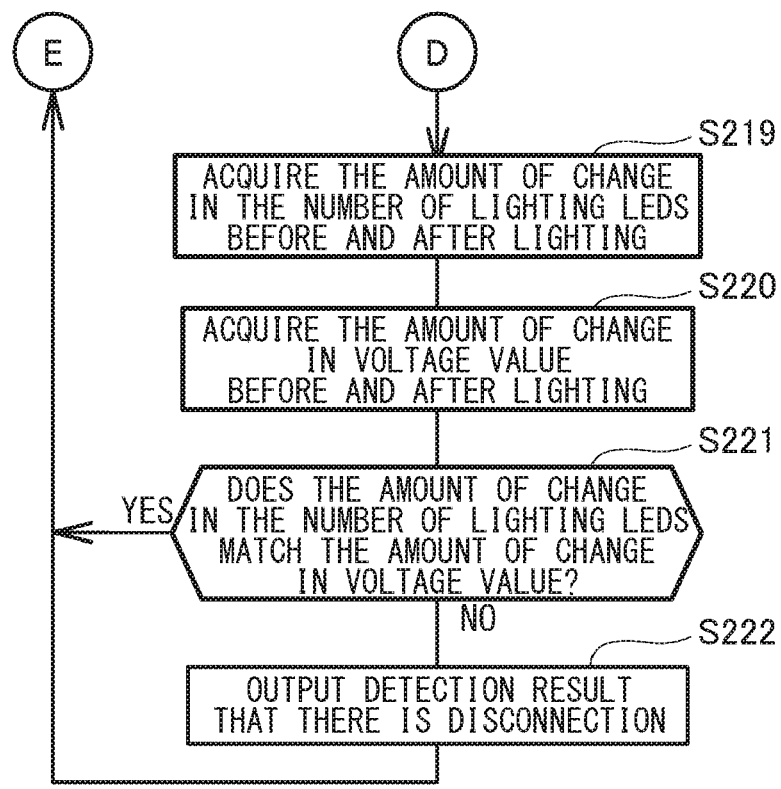
FIG. 18 is a flowchart showing a second half of the lighting control process according to the modification.

FIGS. 16 to 18 show flowcharts of a lighting control process according to a modification of detecting whether there is a disconnection by the method described above.

As shown in the figure, in the lighting control process according to the modification, as in the lighting control process according to the present embodiment described above, first, it is determined whether lighting is to be started by use of the LED array 10 (S200). When it is determined that the lighting is not to be started (NO in S200), a waiting state is set while repeating the same determination, but when it is determined that the lighting is to be started (YES in S200), the light distribution pattern is acquired from the lamp ECU 50 (S201).

After the lighting schedule corresponding to the light distribution pattern is generated (S202), the driving of the switch elements SWs corresponding to the respective LEDs is started according to the lighting schedule (S203).

Next, it is determined whether the lighting is to be terminated (S204), and if the lighting is not to be terminated (NO in S204), it is determined whether the lighting cycle has elapsed (S205). As a result, when the lighting cycle has not elapsed (NO in S205), it is determined whether the present timing is the detection timing DTf before lighting (S210 in FIG. 17). As described above with reference to FIG. 15, in the lighting control process according to the modification, the detection timing DTf before lighting and the detection timing DTr after lighting are set before and after the timing at which the LED 1 to the LED 12 are turned on. Therefore, in S210, it is determined any detection timing DTf has come.

As a result, when it is determined that the detection timing DTf is not detected (NO in S210), the flow returns to S204 in FIG. 16, and it is determined whether the lighting is to be terminated. Then, when the lighting is not to be terminated (NO in S204), it is determined whether the lighting cycle has elapsed (S205), and when the lighting cycle has not elapsed (NO in S205), it is determined whether the detection timing DTf before lighting has come (S210 in FIG. 17).

If it is determined that the detection timing DTf before lighting has come while repeating the above operation (YES in S210 of FIG. 17), it is determined whether there is an LED that turns off within a predetermined period (S211). In the case of the modification, similarly to the embodiment described above, the predetermined period is set to a time obtained by adding a predetermined margin time dT (a time shorter than the interval period IT) to the interval period IT. In addition, similarly to the embodiment described above, the margin time dT may be simply ignored.

When there is an LED which is turned off within the predetermined period (YES in S211), it is determined whether the lighting is to be terminated (S204 in FIG. 16). On the other hand, when there is no LED to be turned off within the predetermined period (NO in S211 of FIG. 17), the number of lighting LEDs (that is, the number of LEDs to be turned on) is acquired (S212), and then the voltage value applied to the LED array 10 is acquired (S213).

Thereafter, in the lighting control process according to the modification, it is determined whether the present timing has come to the detection timing DTr after lighting (S214). In other words, in the lighting control process according to the modification, the detection timing DTf before lighting and the detection timing DTr after lighting are set before and after the timing at which the LED 1 to the LED 12 are turned on, and since the detection timing DTf before lighting has already been determined in S210, it is determined whether the detection timing DTr after lighting has come.

As a result, when it is determined that the detection timing DTr has not yet come (NO in S214), the same determination is repeated until the detection timing DTr comes, thereby entering a waiting state.

A time from the timing at which the LED is turned on to the detection timing DTr after the LED has been turned on is set to a time obtained by adding a predetermined margin time dT to the interval period IT, similarly to the detection timing DT of the present embodiment described above.

As a result, when it is determined that the detection timing DTr after lighting has come (YES in S214 of FIG. 17), it is determined whether the number of lighting LEDs and the voltage value have been detected at the detection timing DTf before lighting (S215). Then, when the number of lighting LEDs and the voltage value have not been detected at the detection timing DTf before lighting (NO in S215), since the amount of change before and after lighting cannot be obtained, it is determined whether the lighting is to be terminated (S204 in FIG. 16).

On the other hand, when the number of lighting and the voltage value are detected at the detection timing DTf before lighting (YES in S215), it is determined whether there is an LED which is turned off within a predetermined period (S216).

Then, if there is an LED to be turned off within the predetermined period (YES in S216), it is determined whether to terminate the lighting (S204 in FIG. 16), but if there is no LED to be turned off within the predetermined period (NO in S216 of FIG. 17), the number of lighting LEDs at the detection timing DTr after lighting is acquired (S217), and then the voltage value applied to the LED array 10 is acquired (S218).

As described above, the time from the timing at which the LED is turned on to the detection timing DTr after lighting is set to the time obtained by adding the predetermined margin time dT to the interval period IT. On the other hand, the time from the detection timing DTf before lighting to the timing at which the LED is turned on can be set to a time shorter than the interval period IT. The reason is that it is determined whether there is an LED to be turned off within a predetermined period prior to the detection timing DTf in S216, and if there is no LED to be turned off (NO in S216), there is no risk that the voltage value is detected at a timing during the voltage value is changing.

Next, the amount of change in the number of lighting LEDs before and after lighting is acquired based on the number of lighting LEDs at the detection timing DTf before lighting acquired in S212 and the number of lighting LEDs at the detection timing DTr after lighting acquired in S217 (S219 in FIG. 18).

Further, the amount of change in the voltage value before and after lighting is acquired based on the voltage value at the detection timing DTf before lighting acquired in S213 and the voltage value at the detection timing DTr after lighting acquired in S218 (S220).

Then, in the same manner as in S115 of the lighting control process according to the present embodiment described above, it is determined whether the amount of change in the number of lighting LEDs matches the amount of change in the voltage value (S221). As a result, when it is determined that the amount of change in the number of lighting LEDs and the amount of change in the voltage value do not match each other (NO in S221), the detection result that "there is a disconnection" is output to the outside (for example, the lamp ECU 50 in FIG. 1B) (S222), the flow returns to S204 in FIG. 16, and it is determined whether to terminate the lighting.

On the other hand, when it is determined that the amount of change in the number of lighting LEDs and the amount of change in the voltage value match each other (YES in S221), the flow returns to S204 in FIG. 16 as it is without outputting the detection result, and it is determined whether the lighting is to be terminated.

The following operation is the same as the lighting control process of the above embodiment in the lighting control process of the modification. Briefly described below, when the lighting cycle has elapsed after repeating the operation described above (YES in S205 of FIG. 16), the light distribution pattern is acquired from the lamp ECU 50 (S206). Then, it is determined whether the newly acquired light distribution pattern has been changed from the previously acquired light distribution pattern (S207), and when there is no change in the light distribution pattern (NO in S207), the series of processes described above is repeated until the lighting cycle has elapsed and a determination of "YES" is made in S205.

On the other hand, when the newly acquired light distribution pattern has been changed from the previously acquired light distribution pattern (YES in S207), a new lighting schedule corresponding to the new light distribution pattern is generated (S208), and the driving of the switch elements SWs is started according to the lighting schedule (S209). Then, after it is determined whether the present timing is the detection timing DTf before lighting (S210 in FIG. 17), the series of operation described above is repeated.

When it is finally determined that the lighting is to be terminated (YES in S204 of FIG. 16), the lighting control process according to the modification shown in FIGS. 16 to 18 is terminated.

In the lighting control process according to the modification described above, it can be determined whether the amount of change in the number of lighting LEDs matches the amount of change in the voltage value before and after the LED 1 to the LED 12 are turned on. For that reason, when a mismatch occurs, it can be determined that the bypass wiring drawn from the downstream side of the LED which is turned on when the mismatch occurs is disconnected.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle front lighting apparatus for illuminating a region in front of a vehicle by use of a plurality of lighting devices in a shared manner, the vehicle front lighting apparatus comprising:
    a lighting device array in which the lighting devices are connected in series;
    a plurality of bypass circuits respectively provided for the lighting devices and allowing a current flowing through the lighting devices to bypass the lighting devices;
    a plurality of switch elements respectively provided for the bypass circuits for opening and closing the bypass circuits;
    a lighting controller configured to control a lighting mode of the lighting device array by bringing the switch elements corresponding to the lighting devices to be turned on into an opened state and bringing the switch elements corresponding to the lighting devices to be turned off into a closed state;
    a current value detector configured to detect a value of current flowing through the lighting device array;
    a voltage value controller configured to apply a voltage to the lighting device array, and to control a voltage value to be applied to cause a value of current flowing through the lighting device array to reach a predetermined target current value;
    a change amount detector configured to detect the number of switch elements brought into the opened state and the voltage value that is controlled every time a predetermined detection condition is satisfied, and to acquire a change in the number of switch elements from the number of switch elements detected last time and a change in the voltage value from the voltage value detected last time; and
    a disconnection determiner configured to determine whether the change in the number of switch elements matches the change in the voltage value, and to determine that a disconnection has occurred in any of the bypass circuits if the change in the number of switch elements and the change in the voltage value do not match.

2. The vehicle front lighting apparatus according to claim 1, wherein
    the lighting controller is further configured to control a brightness of the lighting devices by opening and closing the switch elements in a predetermined cycle and changing a time ratio of the opened state in the predetermined cycle, and
    phases of the predetermined cycle for opening and closing the switch elements are set to be mutually shifted among the switch elements.

3. The vehicle front lighting apparatus according to claim 2, wherein
    the lighting controller is further configured to set each of the switch elements to the opened state at a predetermined lighting timing set based on the predetermined cycle of each of the switch elements, and then to set each of the switch elements to the closed state at a turn-off timing corresponding to the time ratio set for each of the switch elements, and
    the change amount detector is further configured to detect the number of switch elements and the voltage value at a predetermined detection timing set based on a timing at which any of the switch elements comes to the lighting timing to acquire the change in the number of switch elements and the change in the voltage value.

4. The vehicle front lighting apparatus according to claim 2, wherein
    the change amount detector is further configured to acquire the change in the number of switch elements and the change in the voltage value by detecting the number of switch elements and the voltage value at predetermined detection timings set before and after a timing at which any of the switch elements is turned on as a reference.

5. The vehicle front lighting apparatus according to claim 3, wherein
    the change amount detector is further configured to stop acquisition of the change in the number of switch elements and the change in the voltage value when there is the switch element that switches to the closed state within a predetermined period based on the detection timing among the switch elements.

6. A disconnection detection method adopted in a vehicle front lighting apparatus for illuminating a region in front of a vehicle by use of a lighting device array in which a plurality of lighting devices are connected in series, for detecting whether a disconnection has occurred in a wiring for driving the lighting devices,
    the vehicle front lighting apparatus including:

a plurality of bypass circuits respectively provided for the lighting devices and allowing a current flowing through the lighting devices to bypass the lighting devices;

a plurality of switch elements respectively provided for the bypass circuits for opening and closing the bypass circuits; and a lighting controller configured to control a lighting mode of the lighting device array by bringing the switch elements corresponding to the lighting devices to be turned on into an opened state and bringing the switch elements corresponding to the lighting devices to be turned off into a closed state, and the disconnection detection method comprising:

applying a voltage to the lighting device array, detecting a value of current flowing through the lighting device array, and controlling a voltage value applied to the lighting device array to cause the value of current flowing through the lighting device array to reach a predetermined target current value;

detecting the number of switch elements brought into the opened state every time a predetermined detection condition is satisfied, and acquiring a change in the number of switch elements from the number of switch elements detected last time;

detecting a voltage value applied to the lighting device array every time the detection condition is satisfied, and acquiring a change in the voltage value from the voltage value detected last time; and determining whether the change in the number of switch elements matches the change in the voltage value, and determining that the disconnection has occurred in any of the bypass circuits if the change in the number of switch elements and the change in the voltage value do not match.

* * * * *